(12) United States Patent
Kannan et al.

(10) Patent No.: US 10,768,819 B2
(45) Date of Patent: Sep. 8, 2020

(54) HARDWARE SUPPORT FOR NON-DISRUPTIVE UPGRADES

(71) Applicant: Pure Storage, Inc., Mountain View, CA (US)

(72) Inventors: Hari Kannan, Mountain View, CA (US); Robert Lee, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 177 days.

(21) Appl. No.: 15/336,624

(22) Filed: Oct. 27, 2016

(65) Prior Publication Data
US 2018/0024830 A1    Jan. 25, 2018

Related U.S. Application Data

(60) Provisional application No. 62/365,861, filed on Jul. 22, 2016.

(51) Int. Cl.
G06F 3/06    (2006.01)
G06F 8/654   (2018.01)
(Continued)

(52) U.S. Cl.
CPC .......... *G06F 3/0607* (2013.01); *G06F 3/0625* (2013.01); *G06F 3/0629* (2013.01);
(Continued)

(58) Field of Classification Search
None
See application file for complete search history.

(56) References Cited

U.S. PATENT DOCUMENTS

| 5,390,327 A | 2/1995 | Lubbers et al. |
| 5,479,653 A | 12/1995 | Jones |

(Continued)

FOREIGN PATENT DOCUMENTS

| EP | 2164006 | 3/2010 |
| EP | 2256621 | 12/2010 |

(Continued)

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

(Continued)

*Primary Examiner* — Jared I Rutz
*Assistant Examiner* — Marwan Ayash
(74) *Attorney, Agent, or Firm* — Womble Bond Dickinson (US) LLP

(57) ABSTRACT

A method for non-disruptive upgrade of a storage system is provided. The method includes disabling, by an interlock, access by one or more processors of the storage system to the first memory, responsive to a request. The method includes persisting configuration information in the first memory to the solid-state memory, with the access to the first memory disabled by the interlock, wherein the persisting, the first memory and the solid-state memory are supported by an energy reserve. The method includes enabling, by the interlock, access by the one or more processors to the first memory, responsive to completing the persisting, and writing, by the one or more processors of the storage system, to the first memory, to perform the upgrade with further configuration information, with the access enabled by the interlock and wherein at least the persisting is accomplished without power cycling.

20 Claims, 16 Drawing Sheets

(51) Int. Cl.
*G06F 8/65* (2018.01)
*G06F 11/14* (2006.01)
*G06F 12/02* (2006.01)

(52) U.S. Cl.
CPC .............. *G06F 3/0685* (2013.01); *G06F 8/65* (2013.01); *G06F 8/654* (2018.02); *G06F 11/1433* (2013.01); *G06F 12/0246* (2013.01)

(56) References Cited

U.S. PATENT DOCUMENTS

| | | | |
|---|---|---|---|
| 5,649,093 A | 7/1997 | Hanko et al. | |
| 6,275,898 B1 | 8/2001 | DeKoning | |
| 6,397,385 B1* | 5/2002 | Kravitz | G06F 9/328 717/173 |
| 6,535,417 B2 | 3/2003 | Tsuda | |
| 6,643,748 B1 | 11/2003 | Wieland | |
| 6,725,392 B1 | 4/2004 | Frey et al. | |
| 6,836,816 B2 | 12/2004 | Kendall | |
| 6,985,995 B2 | 1/2006 | Holland et al. | |
| 7,032,125 B2 | 4/2006 | Holt et al. | |
| 7,051,155 B2 | 5/2006 | Talagala et al. | |
| 7,065,617 B2 | 6/2006 | Wang | |
| 7,069,383 B2 | 6/2006 | Yamamoto et al. | |
| 7,076,606 B2 | 7/2006 | Orsley | |
| 7,107,480 B1 | 9/2006 | Moshayedi et al. | |
| 7,159,150 B2 | 1/2007 | Kenchammana-Hosekote et al. | |
| 7,162,575 B2 | 1/2007 | Dalal et al. | |
| 7,164,608 B2 | 1/2007 | Lee | |
| 7,334,156 B2 | 2/2008 | Land et al. | |
| 7,370,220 B1 | 5/2008 | Nguyen et al. | |
| 7,424,498 B1 | 9/2008 | Patterson | |
| 7,424,592 B1 | 9/2008 | Karr | |
| 7,444,532 B2 | 10/2008 | Masuyama et al. | |
| 7,480,658 B2 | 1/2009 | Heinla et al. | |
| 7,536,506 B2 | 5/2009 | Ashmore et al. | |
| 7,558,859 B2 | 7/2009 | Kasiolas | |
| 7,565,446 B2 | 7/2009 | Talagala et al. | |
| 7,613,947 B1 | 11/2009 | Coatney | |
| 7,681,104 B1 | 3/2010 | Sim-Tang et al. | |
| 7,681,105 B1 | 3/2010 | Sim-Tang et al. | |
| 7,730,258 B1 | 6/2010 | Smith | |
| 7,743,276 B2 | 6/2010 | Jacobsen et al. | |
| 7,757,038 B2 | 7/2010 | Kitahara | |
| 7,778,960 B1 | 8/2010 | Chatterjee et al. | |
| 7,814,272 B2 | 10/2010 | Barrall et al. | |
| 7,814,273 B2 | 10/2010 | Barrall | |
| 7,818,531 B2 | 10/2010 | Barrall | |
| 7,827,351 B2 | 11/2010 | Suetsugu et al. | |
| 7,827,439 B2 | 11/2010 | Matthew et al. | |
| 7,870,105 B2 | 1/2011 | Arakawa et al. | |
| 7,885,938 B1 | 2/2011 | Greene et al. | |
| 7,886,111 B2 | 2/2011 | Klemm et al. | |
| 7,908,448 B1 | 3/2011 | Chatterjee et al. | |
| 7,916,538 B2 | 3/2011 | Jeon et al. | |
| 7,941,697 B2 | 5/2011 | Mathew et al. | |
| 7,958,303 B2 | 6/2011 | Shuster | |
| 7,971,129 B2 | 6/2011 | Watson | |
| 7,991,822 B2 | 8/2011 | Bish et al. | |
| 8,010,485 B1 | 8/2011 | Chatterjee et al. | |
| 8,010,829 B1 | 8/2011 | Chatterjee et al. | |
| 8,020,047 B2 | 9/2011 | Courtney | |
| 8,046,548 B1 | 10/2011 | Chatterjee et al. | |
| 8,051,361 B2 | 11/2011 | Sim-Tang et al. | |
| 8,051,362 B2 | 11/2011 | Li et al. | |
| 8,082,393 B2 | 12/2011 | Galloway et al. | |
| 8,086,634 B2 | 12/2011 | Mimatsu | |
| 8,086,911 B1 | 12/2011 | Taylor | |
| 8,090,837 B2 | 1/2012 | Shin et al. | |
| 8,108,502 B2 | 1/2012 | Tabbara et al. | |
| 8,117,388 B2 | 2/2012 | Jernigan, IV | |
| 8,140,821 B1 | 3/2012 | Raizen et al. | |
| 8,145,838 B1 | 3/2012 | Miller et al. | |
| 8,145,840 B2 | 3/2012 | Koul et al. | |
| 8,176,360 B2 | 5/2012 | Frost et al. | |
| 8,180,855 B2 | 5/2012 | Aiello et al. | |
| 8,190,720 B1* | 5/2012 | Yellai | H04L 67/34 709/221 |
| 8,200,922 B2 | 6/2012 | McKean et al. | |
| 8,225,006 B1 | 7/2012 | Karamcheti | |
| 8,239,618 B2 | 8/2012 | Kotzur et al. | |
| 8,244,999 B1 | 8/2012 | Chatterjee et al. | |
| 8,305,811 B2 | 11/2012 | Jeon | |
| 8,315,999 B2 | 11/2012 | Chatley et al. | |
| 8,327,080 B1 | 12/2012 | Der | |
| 8,351,290 B1 | 1/2013 | Huang et al. | |
| 8,375,146 B2 | 2/2013 | Sinclair | |
| 8,397,016 B2 | 3/2013 | Talagala et al. | |
| 8,402,152 B2 | 3/2013 | Duran | |
| 8,412,880 B2 | 4/2013 | Leibowitz et al. | |
| 8,423,739 B2 | 4/2013 | Ash et al. | |
| 8,429,436 B2 | 4/2013 | Filingim et al. | |
| 8,473,778 B2 | 6/2013 | Simitci | |
| 8,479,037 B1 | 7/2013 | Chatterjee et al. | |
| 8,498,967 B1 | 7/2013 | Chatterjee et al. | |
| 8,522,073 B2 | 8/2013 | Cohen | |
| 8,533,527 B2 | 9/2013 | Daikokuya et al. | |
| 8,544,029 B2 | 9/2013 | Bakke et al. | |
| 8,589,625 B2 | 11/2013 | Colgrove et al. | |
| 8,595,455 B2 | 11/2013 | Chatterjee et al. | |
| 8,615,599 B1 | 12/2013 | Takefman et al. | |
| 8,627,136 B2 | 1/2014 | Shankar et al. | |
| 8,627,138 B1 | 1/2014 | Clark | |
| 8,660,131 B2 | 2/2014 | Vermunt et al. | |
| 8,661,218 B1 | 2/2014 | Piszczek et al. | |
| 8,700,875 B1 | 4/2014 | Barron et al. | |
| 8,706,694 B2 | 4/2014 | Chatterjee et al. | |
| 8,706,914 B2 | 4/2014 | Duchesneau | |
| 8,713,405 B2 | 4/2014 | Healey et al. | |
| 8,725,730 B2 | 5/2014 | Keeton et al. | |
| 8,756,387 B2 | 6/2014 | Frost et al. | |
| 8,762,793 B2 | 6/2014 | Grube et al. | |
| 8,775,858 B2 | 7/2014 | Gower et al. | |
| 8,775,868 B2 | 7/2014 | Colgrove et al. | |
| 8,788,913 B1 | 7/2014 | Xin et al. | |
| 8,799,746 B2 | 8/2014 | Baker et al. | |
| 8,819,311 B2 | 8/2014 | Liao | |
| 8,819,383 B1 | 8/2014 | Jobanputra et al. | |
| 8,824,261 B1 | 9/2014 | Miller et al. | |
| 8,843,700 B1 | 9/2014 | Salessi et al. | |
| 8,850,108 B1 | 9/2014 | Hayes et al. | |
| 8,850,288 B1 | 9/2014 | Lazier et al. | |
| 8,856,593 B2 | 10/2014 | Eckhardt et al. | |
| 8,856,619 B1 | 10/2014 | Cypher | |
| 8,862,847 B2 | 10/2014 | Feng et al. | |
| 8,862,928 B2 | 10/2014 | Xavier et al. | |
| 8,868,825 B1 | 10/2014 | Hayes | |
| 8,874,836 B1 | 10/2014 | Hayes | |
| 8,880,802 B1* | 11/2014 | Krishnamurthy | G06F 12/0804 711/114 |
| 8,886,778 B2 | 11/2014 | Nedved et al. | |
| 8,898,383 B2 | 11/2014 | Yamamoto et al. | |
| 8,898,388 B1 | 11/2014 | Kimmel | |
| 8,904,231 B2 | 12/2014 | Coatney et al. | |
| 8,918,478 B2 | 12/2014 | Ozzie et al. | |
| 8,930,307 B2 | 1/2015 | Colgrove et al. | |
| 8,930,633 B2 | 1/2015 | Amit et al. | |
| 8,949,502 B2 | 2/2015 | McKnight et al. | |
| 8,959,110 B2 | 2/2015 | Smith et al. | |
| 8,977,597 B2 | 3/2015 | Ganesh et al. | |
| 9,003,144 B1 | 4/2015 | Hayes et al. | |
| 9,009,724 B2 | 4/2015 | Gold et al. | |
| 9,021,053 B2 | 4/2015 | Bernbo et al. | |
| 9,021,215 B2 | 4/2015 | Meir et al. | |
| 9,025,393 B2 | 5/2015 | Wu | |
| 9,043,372 B2 | 5/2015 | Makkar et al. | |
| 9,053,808 B2 | 6/2015 | Sprouse | |
| 9,058,155 B2 | 6/2015 | Cepulis et al. | |
| 9,116,819 B2 | 8/2015 | Cope et al. | |
| 9,117,536 B2 | 8/2015 | Yoon | |
| 9,122,401 B2 | 9/2015 | Zaltsman et al. | |
| 9,134,908 B2 | 9/2015 | Horn et al. | |
| 9,153,337 B2 | 10/2015 | Sutardja | |
| 9,189,650 B2 | 11/2015 | Jaye et al. | |

(56) References Cited

U.S. PATENT DOCUMENTS

| | | | |
|---|---|---|---|
| 9,201,733 B2 | 12/2015 | Verma | |
| 9,207,876 B2 | 12/2015 | Shu et al. | |
| 9,251,066 B2 | 2/2016 | Colgrove et al. | |
| 9,323,667 B2 | 4/2016 | Bennett | |
| 9,323,681 B2 | 4/2016 | Apostolides et al. | |
| 9,348,538 B2 | 5/2016 | Mallaiah et al. | |
| 9,384,082 B1 | 7/2016 | Lee et al. | |
| 9,390,019 B2 | 7/2016 | Patterson et al. | |
| 9,405,478 B2 | 8/2016 | Koseki et al. | |
| 9,432,541 B2 | 8/2016 | Ishida | |
| 9,477,632 B2 | 10/2016 | Du | |
| 9,552,299 B2 | 1/2017 | Stalzer | |
| 9,818,478 B2 | 11/2017 | Chung | |
| 9,829,066 B2 | 11/2017 | Thomas et al. | |
| 2002/0144059 A1 | 10/2002 | Kendall | |
| 2003/0105984 A1 | 6/2003 | Masuyama et al. | |
| 2003/0110205 A1 | 6/2003 | Johnson | |
| 2004/0161086 A1 | 8/2004 | Buntin et al. | |
| 2005/0001652 A1 | 1/2005 | Malik et al. | |
| 2005/0076228 A1 | 4/2005 | Davis et al. | |
| 2005/0235132 A1 | 10/2005 | Karr et al. | |
| 2005/0278460 A1 | 12/2005 | Shin et al. | |
| 2005/0283649 A1 | 12/2005 | Turner et al. | |
| 2006/0015683 A1 | 1/2006 | Ashmore et al. | |
| 2006/0114930 A1 | 6/2006 | Lucas et al. | |
| 2006/0174157 A1 | 8/2006 | Barrall et al. | |
| 2006/0248294 A1 | 11/2006 | Nedved et al. | |
| 2007/0079068 A1 | 4/2007 | Draggon | |
| 2007/0214194 A1 | 9/2007 | Reuter | |
| 2007/0214314 A1 | 9/2007 | Reuter | |
| 2007/0234016 A1 | 10/2007 | Davis et al. | |
| 2007/0268905 A1 | 11/2007 | Baker et al. | |
| 2008/0080709 A1 | 4/2008 | Michtchenko et al. | |
| 2008/0107274 A1 | 5/2008 | Worthy | |
| 2008/0155191 A1 | 6/2008 | Anderson et al. | |
| 2008/0295118 A1 | 11/2008 | Liao | |
| 2009/0077208 A1 | 3/2009 | Nguyen et al. | |
| 2009/0138654 A1 | 5/2009 | Sutardja | |
| 2009/0216910 A1 | 8/2009 | Duchesneau | |
| 2009/0216920 A1 | 8/2009 | Lauterbach et al. | |
| 2010/0017444 A1 | 1/2010 | Chatterjee et al. | |
| 2010/0042636 A1 | 2/2010 | Lu | |
| 2010/0094806 A1 | 4/2010 | Apostolides et al. | |
| 2010/0115070 A1 | 5/2010 | Missimilly | |
| 2010/0125695 A1 | 5/2010 | Wu et al. | |
| 2010/0162076 A1 | 6/2010 | Sim-Tang et al. | |
| 2010/0169707 A1 | 7/2010 | Mathew et al. | |
| 2010/0174576 A1 | 7/2010 | Naylor | |
| 2010/0268867 A1* | 10/2010 | Gyl | G06F 8/65 711/103 |
| 2010/0268908 A1 | 10/2010 | Ouyang et al. | |
| 2011/0040925 A1 | 2/2011 | Frost et al. | |
| 2011/0060927 A1 | 3/2011 | Fillingim et al. | |
| 2011/0119462 A1 | 5/2011 | Leach et al. | |
| 2011/0219170 A1 | 9/2011 | Frost et al. | |
| 2011/0238625 A1 | 9/2011 | Hamaguchi et al. | |
| 2011/0264843 A1 | 10/2011 | Haines et al. | |
| 2011/0302369 A1 | 12/2011 | Goto et al. | |
| 2012/0011398 A1 | 1/2012 | Eckhardt | |
| 2012/0079318 A1 | 3/2012 | Colgrove et al. | |
| 2012/0110249 A1 | 5/2012 | Jeong et al. | |
| 2012/0131253 A1 | 5/2012 | McKnight | |
| 2012/0158923 A1 | 6/2012 | Mohamed et al. | |
| 2012/0191900 A1 | 7/2012 | Kunimatsu et al. | |
| 2012/0198152 A1 | 8/2012 | Terry et al. | |
| 2012/0198261 A1 | 8/2012 | Brown et al. | |
| 2012/0209943 A1 | 8/2012 | Jung | |
| 2012/0226934 A1 | 9/2012 | Rao | |
| 2012/0246435 A1 | 9/2012 | Meir et al. | |
| 2012/0260055 A1 | 10/2012 | Murase | |
| 2012/0311557 A1 | 12/2012 | Resch | |
| 2013/0022201 A1 | 1/2013 | Glew et al. | |
| 2013/0036314 A1 | 2/2013 | Glew et al. | |
| 2013/0042056 A1 | 2/2013 | Shats | |
| 2013/0060884 A1 | 3/2013 | Bernbo et al. | |
| 2013/0067188 A1 | 3/2013 | Mehra et al. | |
| 2013/0073894 A1 | 3/2013 | Xavier et al. | |
| 2013/0124776 A1 | 5/2013 | Hallak et al. | |
| 2013/0132800 A1 | 5/2013 | Healy et al. | |
| 2013/0151653 A1 | 6/2013 | Sawicki | |
| 2013/0151771 A1 | 6/2013 | Tsukahara et al. | |
| 2013/0173853 A1 | 7/2013 | Ungureanu et al. | |
| 2013/0238554 A1 | 9/2013 | Yucel et al. | |
| 2013/0339314 A1 | 12/2013 | Carpentier et al. | |
| 2013/0339635 A1 | 12/2013 | Amit et al. | |
| 2013/0339818 A1 | 12/2013 | Baker et al. | |
| 2014/0040535 A1 | 2/2014 | Lee | |
| 2014/0040702 A1 | 2/2014 | He et al. | |
| 2014/0047263 A1 | 2/2014 | Coatney et al. | |
| 2014/0047269 A1 | 2/2014 | Kim | |
| 2014/0063721 A1 | 3/2014 | Herman et al. | |
| 2014/0064048 A1 | 3/2014 | Cohen et al. | |
| 2014/0068224 A1 | 3/2014 | Fan et al. | |
| 2014/0075252 A1 | 3/2014 | Luo et al. | |
| 2014/0136880 A1 | 5/2014 | Shankar et al. | |
| 2014/0181402 A1 | 6/2014 | White | |
| 2014/0237164 A1 | 8/2014 | Le et al. | |
| 2014/0279936 A1 | 9/2014 | Bernbo et al. | |
| 2014/0280025 A1 | 9/2014 | Eidson et al. | |
| 2014/0289588 A1 | 9/2014 | Nagadomi et al. | |
| 2014/0380125 A1 | 12/2014 | Calder et al. | |
| 2014/0380126 A1 | 12/2014 | Yekhanin et al. | |
| 2015/0032720 A1 | 1/2015 | James | |
| 2015/0039645 A1 | 2/2015 | Lewis | |
| 2015/0039849 A1 | 2/2015 | Lewis | |
| 2015/0089283 A1 | 3/2015 | Kermarrec et al. | |
| 2015/0100746 A1 | 4/2015 | Rychlik | |
| 2015/0134824 A1 | 5/2015 | Mickens | |
| 2015/0153800 A1 | 6/2015 | Lucas et al. | |
| 2015/0180714 A1 | 6/2015 | Chunn | |
| 2015/0280959 A1 | 10/2015 | Vincent | |
| 2016/0118121 A1* | 4/2016 | Kelly | G06F 13/4068 710/301 |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

(56) References Cited

OTHER PUBLICATIONS

International Search Report and the Written Opinion of the International Searching Authority, PCT/US2015/039137, dated Oct. 1, 2015.
International Search Report, PCT/US2015/044370, dated Dec. 15, 2015.
International Search Report amd the Written Opinion of the International Searching Authority, PCT/US2016/031039, dated May 5, 2016.
International Search Report, PCT/US2016/014604, dated May 19, 2016.
International Search Report, PCT/US2016/014361, dated May 30, 2016.
International Search Report, PCT/US2016/014356, dated Jun. 28, 2016.
International Search Report, PCT/US2016/014357, dated Jun. 29, 2016.
International Seach Report and the Written Opinion of the International Searching Authority, PCT/US2016/016504, dated Jul. 6, 2016.
International Seach Report and the Written Opinion of the International Searching Authority, PCT/US2016/024391, dated Jul. 12, 2016.
International Seach Report and the Written Opinion of the International Searching Authority, PCT/US2016/026529, dated Jul. 19, 2016.
International Search Report and the Written Opinion of the International Searching Authority, PCT/US2016/023485, dated Jul. 21, 2016.
International Seach Report and the Written Opinion of the International Searching Authority, PCT/US2016/033306, dated Aug. 19, 2016.
International Seach Report and the Written Opinion of the International Searching Authority, PCT/US2016/047808, dated Nov. 25, 2016.
Stalzer, Mark A., "FlashBlades: System Architecture and Applications," Proceedings of the 2nd Workshop on Architectures and Systems for Big Data, Association for Computing Machinery, New York, NY, 2012, pp. 10-14.
International Seach Report and the Written Opinion of the International Searching Authority, PCT/US2016/042147, dated Nov. 30, 2016.

* cited by examiner

HARDWARE SUPPORT FOR NON-DISRUPTIVE UPGRADES

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. It is within this context that the embodiments arise.

SUMMARY

In some embodiments, a method for non-disruptive upgrade of a storage system is provided. The method includes disabling, by an interlock, access by one or more processors of the storage system to the first memory, responsive to a request. The method includes persisting configuration information in the first memory to the solid-state memory, with the access to the first memory by the one or more processors disabled by the interlock, wherein the persisting, the first memory and the solid-state memory are supported by an energy reserve. The method includes enabling, by the interlock, access by the one or more processors to the first memory, responsive to completing the persisting, and writing, by the one or more processors of the storage system, to the first memory, to perform the upgrade with further configuration information, with the access enabled by the interlock and wherein at least the persisting is accomplished under continuous supplied power, without power cycling.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
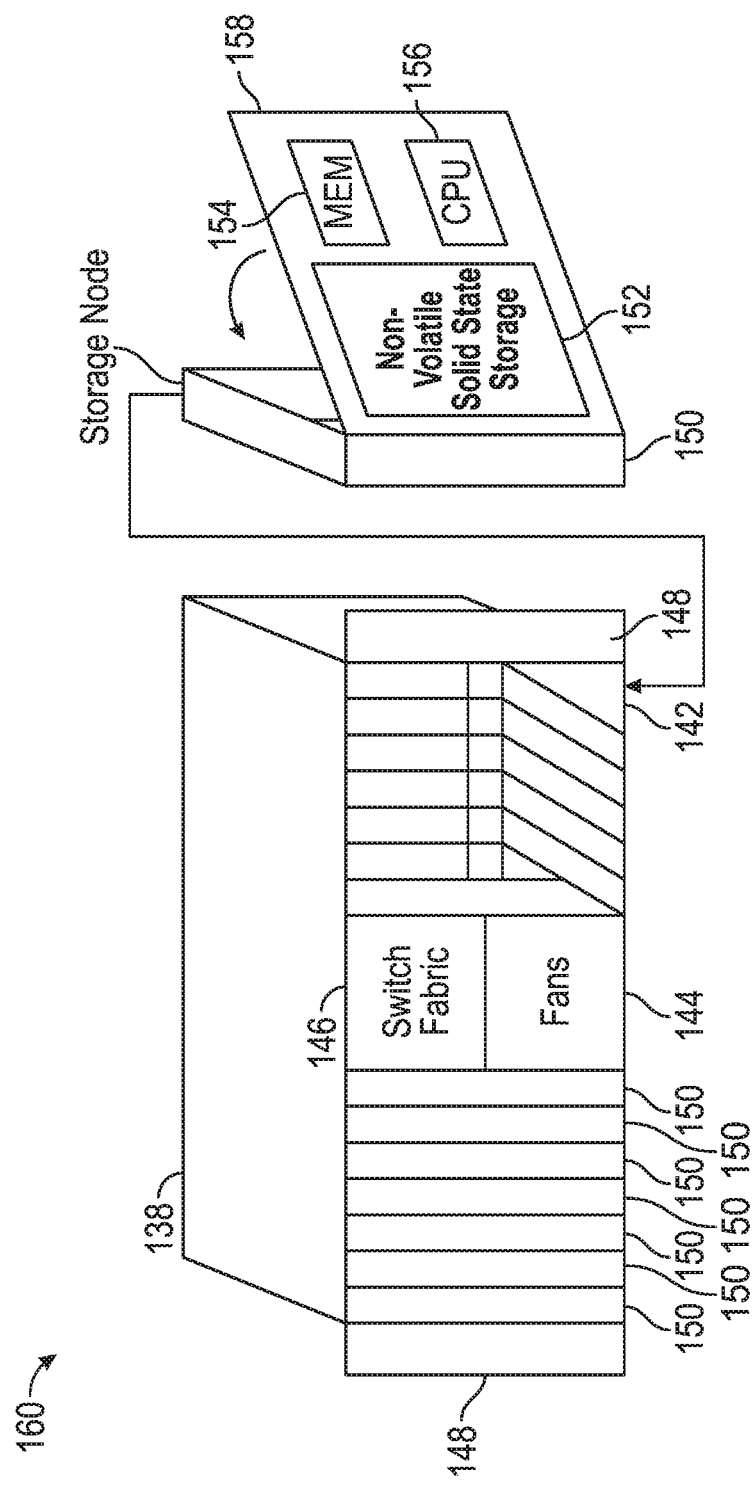
FIG. 1 is a perspective view of a storage cluster with multiple storage nodes and internal storage coupled to each storage node to provide network attached storage, in accordance with some embodiments.

Various storage systems described herein, and further storage systems, can be optimized for distribution of selected data, according to various criteria, in flash or other solid-state memory. The embodiments for the distributed flash wear leveling system are optimized for faster read access to the flash or other solid-state memory. Flash memory that is worn, i.e., that has a large number of program/erase cycles, often or usually has a greater error rate during read accesses, and this adds to read latency for data bits as a result of the processing time overhead to perform error correction. Various embodiments of the storage system track program/erase cycles, or track read errors or error rates, for example on a page, block, die, package, board, storage unit or storage node basis, are aware of faster and slower types or designs of flash memory or portions of flash memory, or otherwise determine relative access speeds for flash memory. The storage system then places data selectively in faster access or slower access locations in or portions of flash memory (or other solid-state memory). One embodiments of the storage system writes data bits to faster access portions of flash memory and parity bits to slower access portions of flash memory. Another embodiment takes advantage of faster and slower access pages of triple level cell flash memory. Principles of operation, variations, and implementation details for distributed flash wear leveling are further discussed below, with reference to FIGS. 6-13, following description of embodiments of a storage cluster with storage nodes, suitable for distributed flash wear leveling, with reference to FIGS. 1-5.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
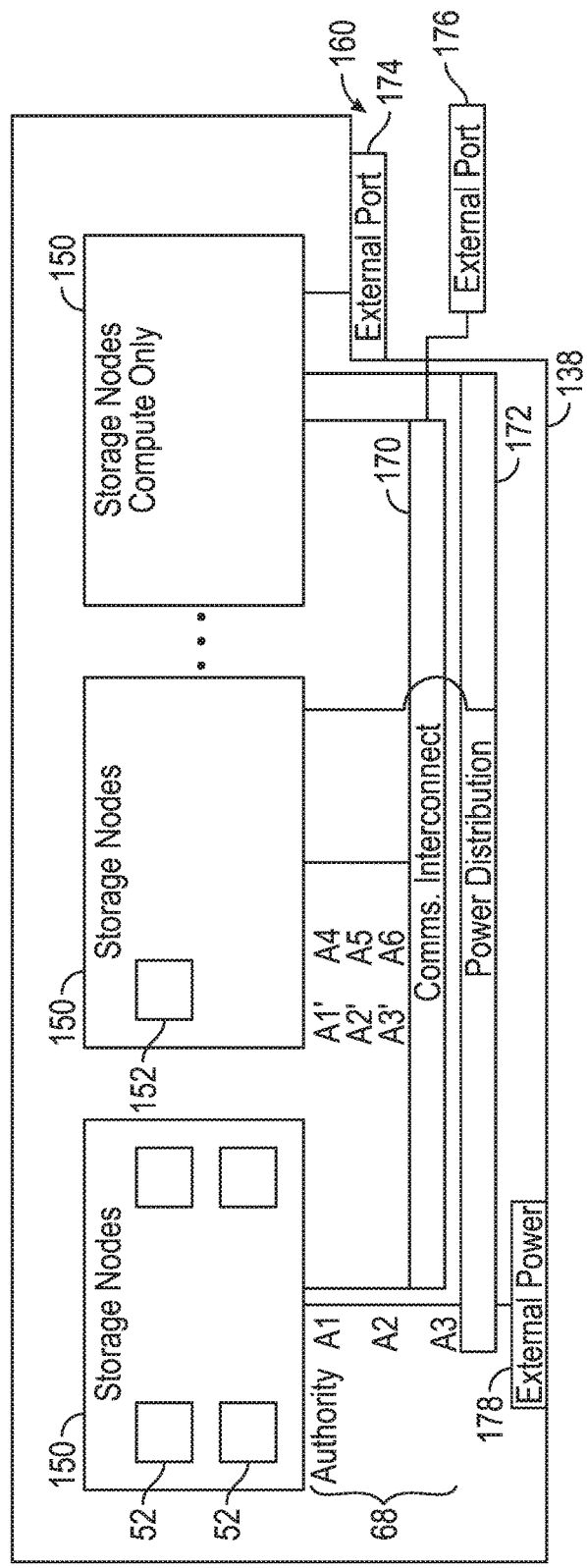
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of Mode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an Mode number or a data segment number. The output of this operation points to a non-volatile solid state storage 152 having the authority 168 for that particular piece of data. In some embodiments there are two stages to this operation. The first stage maps an entity identifier (ID), e.g., a segment number, Mode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or Mode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being trasmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements.

This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
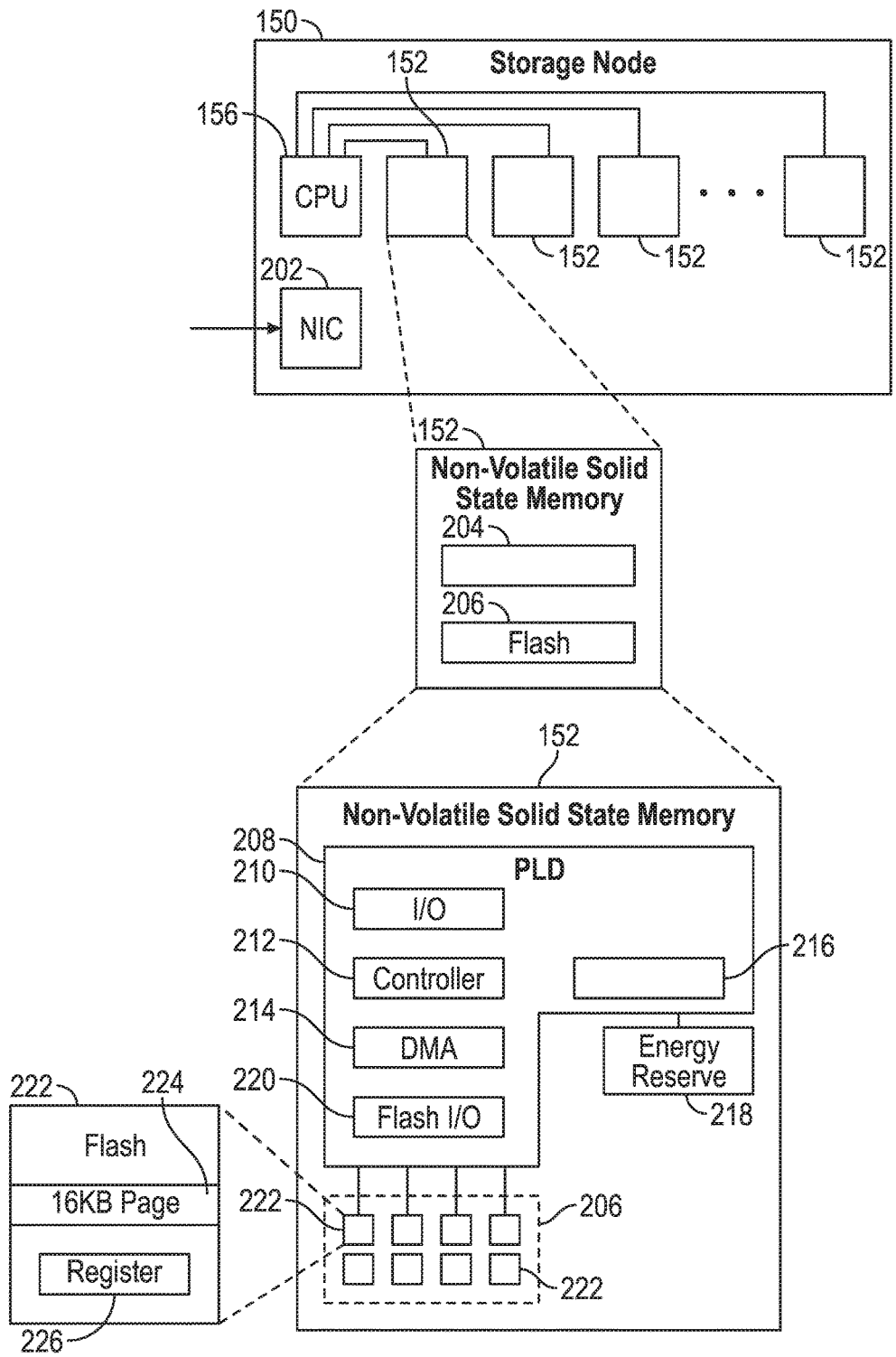
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
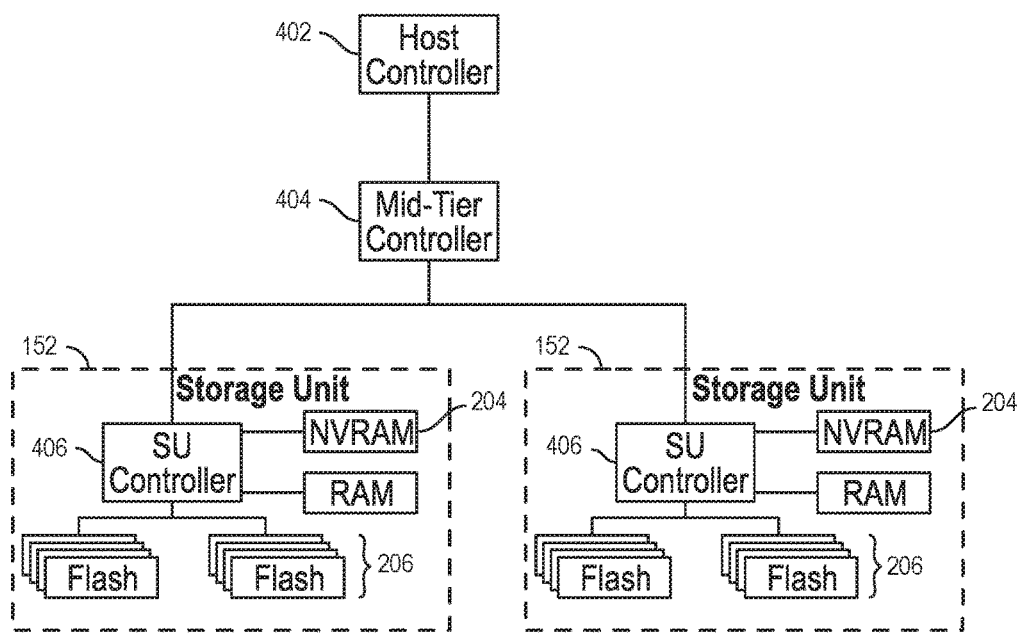
FIG. 4 shows a storage server environment, which may utilize the embodiments of the storage nodes and storage units of FIGS. 1-3.

FIG. 4 shows a storage server environment, which uses embodiments of the storage nodes 150 and storage units 152 of FIGS. 1-3. In this version, each storage unit 152 has a processor such as controller 212 (see FIG. 3), an FPGA (field programmable gate array), flash memory 206, and NVRAM 204 (which may be super-capacitor backed DRAM 216, see FIG. 3) on a PCIe (peripheral component interconnect express) board in a chassis 138 (see FIG. 1). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 512 independently. Each device provides an amount of storage space to each authority 512. That authority 512 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 512. This distribution of logical control is shown in FIG. 4 as a host controller 402, mid-tier controller 404 and storage unit controller(s) 406. Management of the control plane and the storage plane are treated independently, although parts may be physically co-located on the same blade. Each authority 512 effectively serves as an independent controller. Each authority 512 provides its own data and metadata structures, its own background workers, and maintains its own lifecycle.

Figure 5:
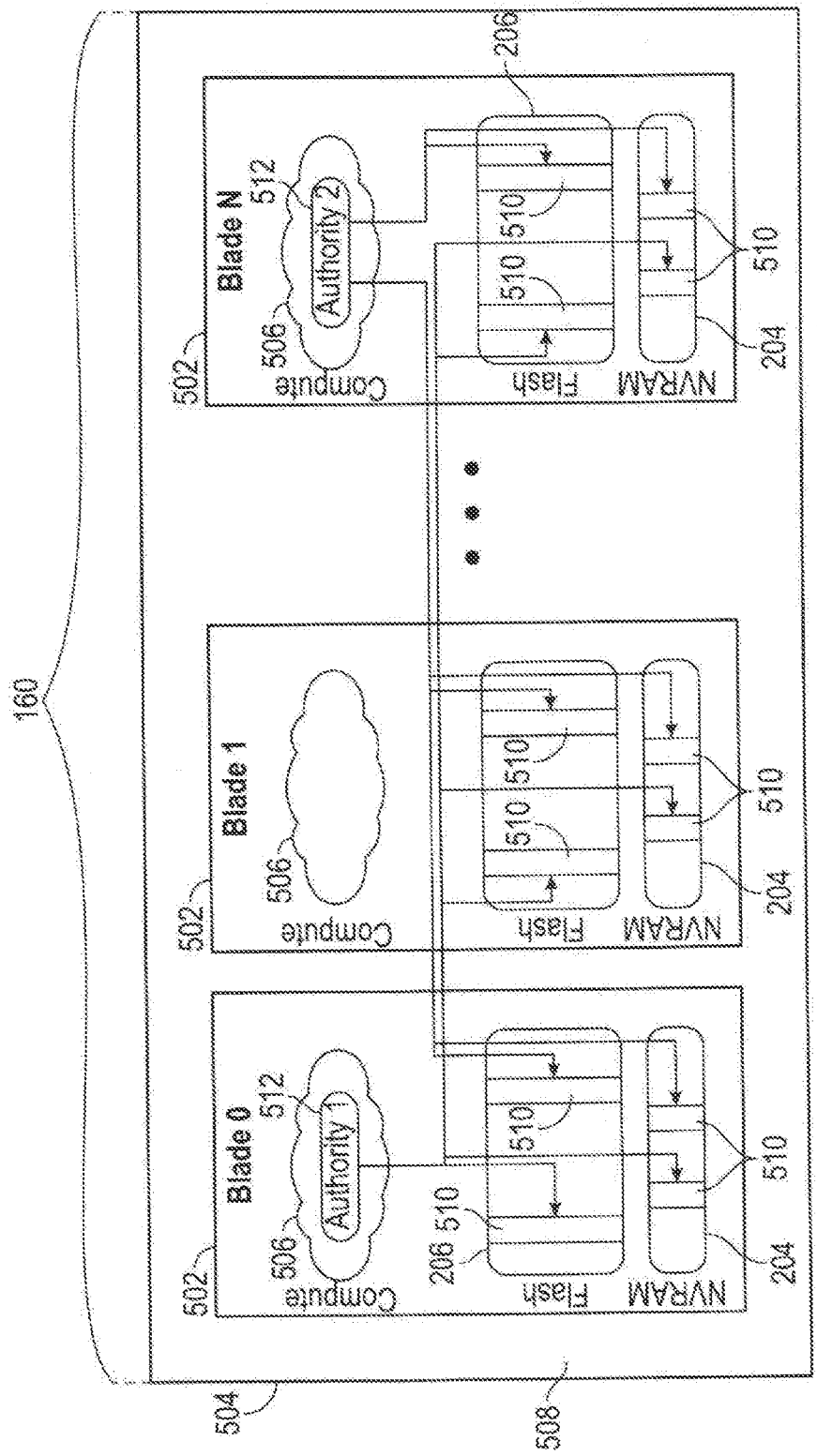
FIG. 5 is a blade hardware block diagram, showing a control plane, compute and storage planes, and authorities interacting with underlying physical resources to perform distributed transactions, using embodiments of the storage nodes and storage units of FIGS. 1-3 in the storage server environment of FIG. 4 in accordance with some embodiments.

FIG. 5 is a blade 502 hardware block diagram, showing a control plane 504, compute and storage planes 506, 508, and authorities 512 interacting with underlying physical resources to perform distributed transactions, using embodiments of the storage nodes 150 and storage units 152 of FIGS. 1-3 in the storage server environment of FIG. 4. The control plane 504 is partitioned into a number of authorities 512 which can use the compute resources in the compute plane 506 to run on any of the blades 502. The storage plane 508 is partitioned into a set of devices, each of which provides access to flash 206 and NVRAM 204 resources. In the compute and storage planes 506, 508 of FIG. 5, the authorities 512 interact with the underlying physical resources (i.e., devices). From the point of view of an authority 512, its resources are striped over all of the physical devices. From the point of view of a device, it provides resources to all authorities 512, irrespective of where the authorities happen to run. In order to communicate and represent the ownership of an authority 402, including the right to record persistent changes on behalf of that authority 402, the authority 402 provides some evidence of authority ownership that can be independently verifiable. A token is employed for this purpose and function in one embodiment, although other techniques are readily devised.

Still referring to FIG. 5, each authority 512 has allocated or has been allocated one or more partitions 510 of storage memory in the storage units 152, e.g. partitions 510 in flash memory 206 and NVRAM 204. Each authority 512 uses those allocated partitions 510 that belong to it, for writing or reading user data. Authorities can be associated with differing amounts of physical storage of the system. For example, one authority 512 could have a larger number of partitions 510 or larger sized partitions 510 in one or more storage units 152 than one or more other authorities 512. The above-described storage systems and storage clusters, and variations thereof, and various further storage systems and storage clusters are suitable for distributed flash wear leveling, as described below with reference to FIGS. 6-13. It should be appreciated that, although described with flash memory, the teachings herein are applicable to other types of solid-state memory and other types of storage memory.

Figure 6:
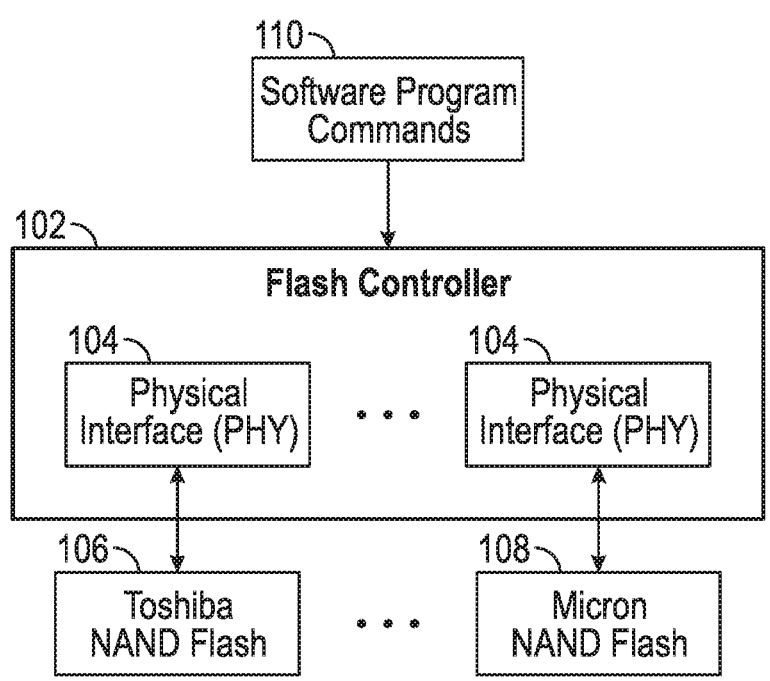
FIG. 6 depicts a flash controller that is configurable to couple to flash memories with differing flash memory device interfaces in accordance with some embodiments.
Figure 7:
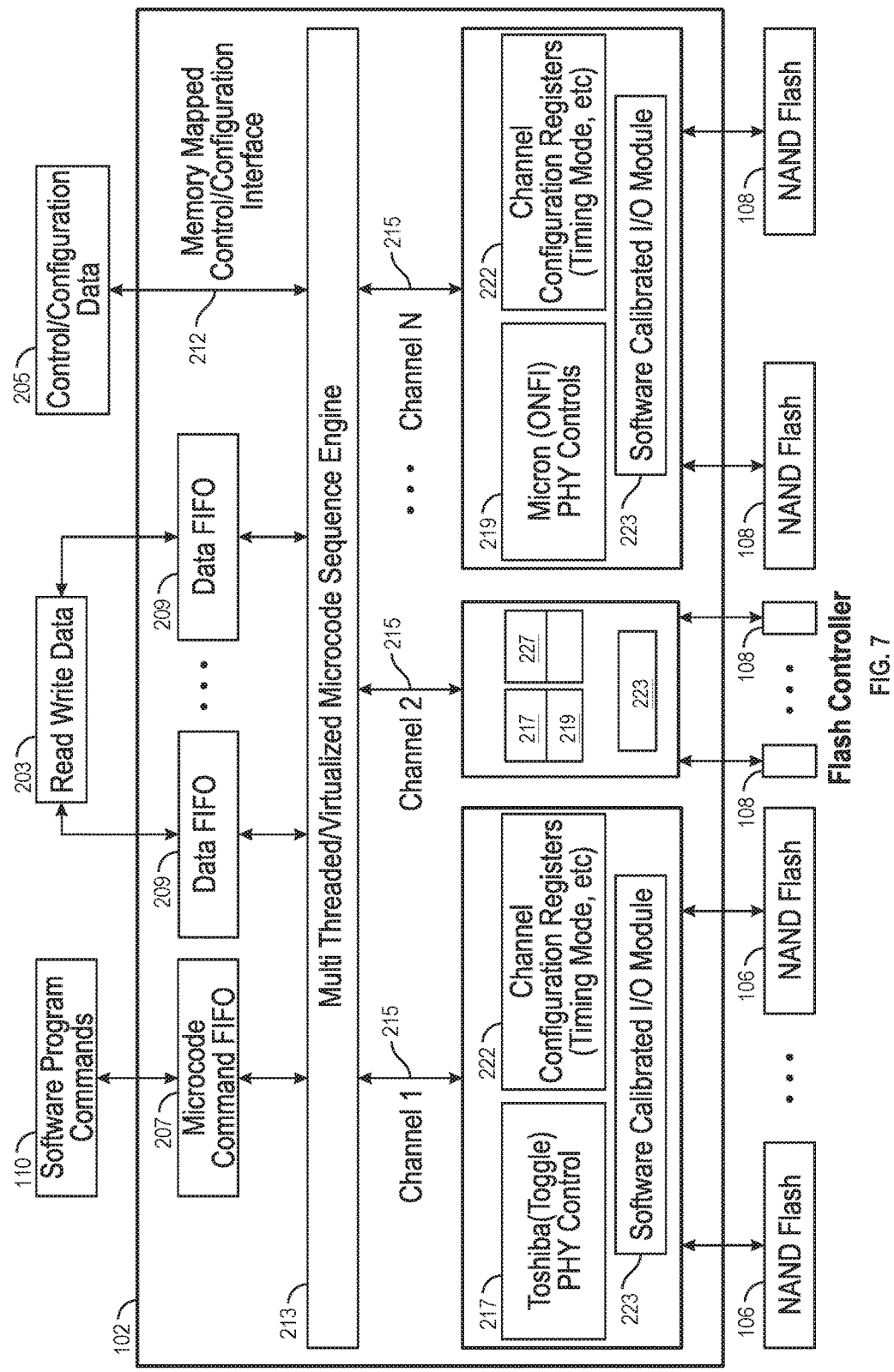
FIG. 7 is a block diagram showing structural details of an embodiment of the flash controller of FIG. 6, including a multithreaded/virtualized microcode sequence engine and multiple channels, each with phy controls, channel configuration registers and a software calibrated I/O module in accordance with some embodiments.

FIGS. 6 and 7 describe a multithreaded multimode NAND flash controller that can be used with multiple flash memory devices having the same or different flash memory interfaces, protocols, operating frequencies and/or signal timing, in various combinations and in various storage devices and systems. The flash controller can select from among multiple protocols, adjust and calibrate operating frequency and signal timing relative to each selected protocol and associated flash memory device interface, independently for each of multiple channels, and dynamically adapt signal rates to varying conditions that flash memory devices experience over time. Such tasks and capabilities are accomplished with a multithreaded and virtualized microcode sequence engine, individual channel configuration, and software calibrated I/O (input/output). Some embodiments can recalibrate signal rates (e.g., signal frequency and/or timing) to compensate for short-term drift the flash memory devices may experience as a result of environmental conditions such as temperature variation, power supply variation, noise, etc. Some embodiments can recalibrate signal rates to compensate for long-term drift or errors that flash memory devices may experience as a result of device wear arising from cumulative reads, cumulative writes, cumulative erasure cycles, etc.

There are fundamental differences between the ONFI and Toggle protocols in terms of physical flash signaling layer. The present flash controller design allows abstraction of much of the low-level complexity away from upper-level software. Upper-level software could, for example, issue "flash read" or "flash write" commands which in turn are processed differently by the controller depending upon the type of flash to which the controller is communicating. The physical controller could decode the command and translate the decoded command to the correct protocol, depending upon the type of flash and corresponding channel configuration.

FIG. 6 depicts a flash controller 102 that is configurable to couple to flash memories 106, 108 with differing flash memory device interfaces. In some embodiments, the flash controller 102 is implemented on a programmable logic device (PLD) or application-specific integrated circuit (ASIC), and includes a processor capable of multithreaded operation and various modules that can be implemented in circuitry, firmware, software executing on the processor, or various combinations thereof. Flash controller 102 corresponds to PLD 208 of FIG. 3 in some embodiments. Software program commands 110 are written into the flash controller 102, for example from an external device that has a processor. Each physical interface 104, or phy, is selectable as to protocol, operating frequency and signal timing, as appropriate to the specific NAND flash 106, 108 and associated flash memory device interface coupled to that physical interface 104. The physical interfaces 104 are independent of each other in the above and below-described selectability and tunability. In the example shown, one of the flash memory devices 106 is a Toshiba™ NAND flash, and another one of the flash memory devices 108 is a Micron™ NAND flash, but other flash memory devices from other manufacturers, or that have other flash memory interfaces and/or other protocols, could be used.

FIG. 7 is a block diagram showing structural details of an embodiment of the flash controller 102 of FIG. 61, including a multithreaded/virtualized microcode sequence engine and multiple channels, each with phy (physical) controls 217, 219, channel configuration registers 221 and a software calibrated I/O module 223. An embodiment of the flash controller 102 is depicted with N channels 215, which could be two channels, three channels, four channels, etc., i.e., for N greater than or equal to two up to however many channels can be physically produced on physical device(s) for the flash controller 102. Each channel 215 is independent of each other channel 215, as to flash memory protocol, operating frequency and/or signal rates of the flash memory device interface, and signal timing relative to the selected flash memory protocol. It should be appreciated that signal rate, as used herein, is inclusive of frequency and/or signal timing. In FIG. 7, the channel 215 labeled channel 1 is shown with Toshiba™ Toggle phy controls 217 (i.e., physical device controls for the Toggle protocol according to the Toshiba™ manufacturer flash devices), per the selected protocol for channel 1. Channel 1 is coupled to multiple NAND flash devices 106, which, in this example, are Toshiba™ flash memories that use the Toggle protocol. Channel configuration registers 221 for channel 1 are loaded with the appropriate values to direct the software calibrated I/O module 223 for channel 1 to time sequences in a protocol (e.g., by timing state machine states, microcode sequences or events, etc.) or to produce timed signals at a particular operating frequency (or signal rate) for the flash devices 106, in various embodiments. A process for how the channel configuration registers 221 are loaded, and a mechanism for how the software calibrated I/O module 223 generates timing for signal rates or generates signals in some embodiments.

Each channel 215 in the flash controller 102 has its own phy controls 217, 219, channel configuration registers 221 and software calibrated I/O module 223, the combination of which are selectable and tunable on an individual, per channel basis, as to protocol, operating frequency, and signal timing. The channel 215 labeled channel N is depicted as having Micron™ ONFI (Open NAND Flash Interface) phy controls 219 (i.e., physical device controls for the ONFI protocol according to the Micron™ manufacturer flash devices), per the selected protocol for channel N. Channel N is coupled to multiple NAND flash devices 108, which, in this example, are Micron™ flash memories that use the ONFI protocol. The flash controller 102 could be operated with flash devices 106 that are all the same (or flash devices 108 that are all the same, etc.), or mixes of flash devices 106, 108 of the various protocols, flash memory device interfaces and manufacturers. Each channel 215 should have the same flash memory devices across that channel 215, but which flash memory device and associated flash memory device interface that channel has is independent of each other channel.

Software program commands 110, which are device independent (i.e., not dependent on a particular flash memory protocol or flash memory device interface) are written by an external device (i.e., a device external to the flash controller 102), such as a processor, into the microcode command FIFO 207 of the flash controller 102. Read/write data 203 is read from or written into the data FIFOs 209. More specifically, write data intended for the flash memories is written into one or more write FIFOs, and read data from the flash memories is read from one or more read FIFOs, collectively illustrated as data FIFOs 209. A memory mapped control/configuration interface 211 is used for control/configuration data, which could also be from an external device such as a processor. The microcode command FIFO 207, the data FIFOs 209, and the memory mapped control/configuration interface 211 are coupled to the multithreaded/virtualized microcode sequence engine 213, which couples to the channels 215, e.g., channels 1 through N. Each channel 215 has a dedicated one or more threads, in a multithreaded operation of the multithreaded/virtualized microcode sequence engine 213. This multithreading virtualizes the microcode sequence engine 213, as if each channel 215 had its own microcode sequence engine 213. In further embodiments, there are multiple physical microcode sequence engines 213, e.g., in a multiprocessing multithreaded operation. This would still be considered an embodiment of the multithreaded/virtualized microcode sequence engine 213.

In some embodiments, state machines control the channels 215. These may act as the above-described virtualized microcode sequence engines 213. For example, in various embodiments, each channel has a state machine, or a state machine could control two channels, two state machines could control each channel, etc. These state machines could be implemented in hardware and fed by the multithreaded/virtualized microcode sequence engine 213, or implemented in threads of the multithreaded/virtualized microcode sequence engine 213, or combinations thereof. In some embodiments, software injects commands into state machine queues, and state machines arbitrate for channels, then issue read or write commands to channels, depending upon operations. In some embodiments, the state machines implement reads, writes and erases, with other commands such as reset, initialization sequences, feature settings, etc., communicated from an external processor along a bypass path which could be controlled by a register. Each state machine could have multiple states for a write, further states for a read, and still further states for erasure cycle(s), with timing and/or frequency (i.e., as affect signal rate) controlled by states, state transitions, and/or an embodiment of the software calibrated I/O module 223.

The microcode command FIFO 207 allows upstream logic to present transactions to the flash controller 102. The format of the command allows for the upstream logic to present entire transactions (with indicators for start of transaction, and end of transaction). The flash controller begins operating upon entire transactions on receipt of end of transaction markers, in some embodiments. In addition to the microcode command FIFO 207, there are two data FIFOs 209, and in some embodiments more than two, to handle data flowing in and out of flash. Also, there is a memory-mapped register interface 211 for the upstream logic to be able to program the different parameters used to set up the flash controller (e.g., calibration, flash mode, flash type, etc.) as described above.

The embodiments described below provide for hardware support to push a prior or old state to a drive without requiring a power cycle. The PLD or FPGA on the storage units (non-volatile solid state memory 152) implements logic to provide support for non-disruptive upgrades. The embodiments atomically persists the state of the machine, e.g., NVRAM before the upgrade occurs. By not requiring a power-cycle, the embodiments are able to provide a non-disruptive upgrade path.

Figure 8:
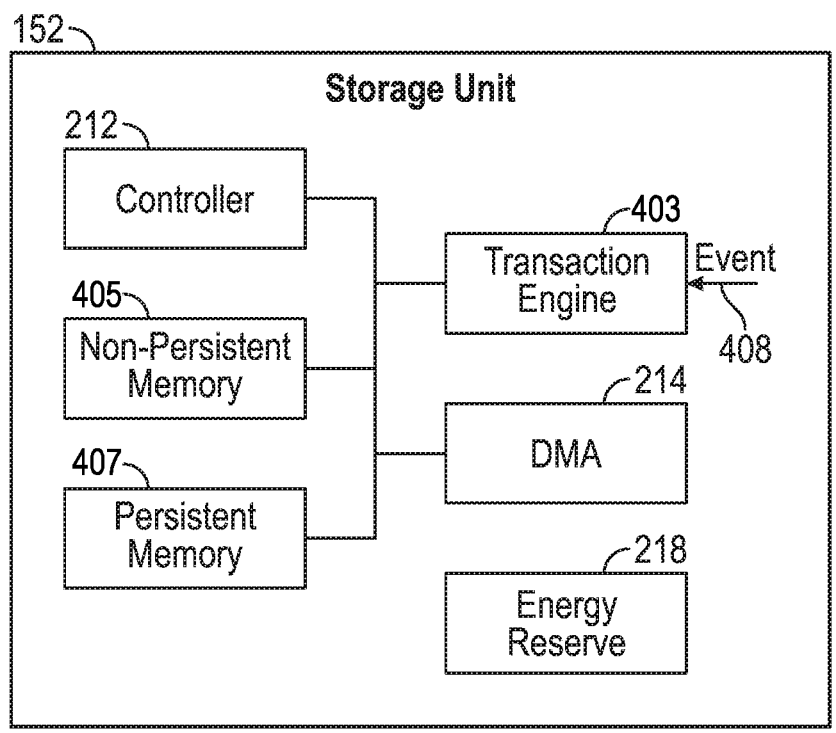
FIG. 8 is a block diagram of an embodiment of a non-volatile solid-state storage unit storage unit with a transaction engine that provides an interlock for atomic updates in accordance with some embodiments.
Figure 9:
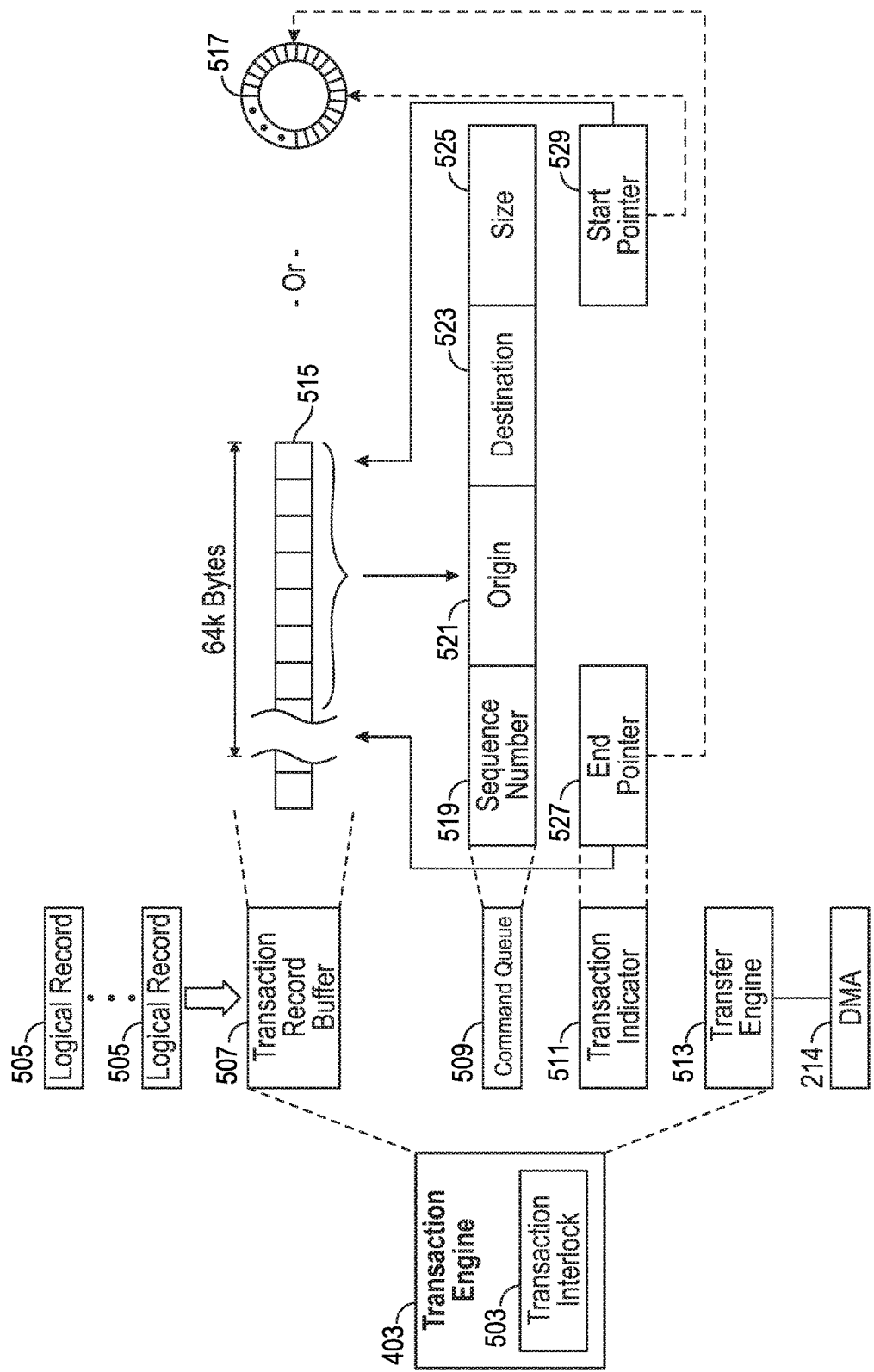
FIG. 9 is a block diagram of an embodiment of the transaction engine of FIG. 4, showing a transaction interlock, in accordance with some embodiments.

FIGS. 8-11 illustrate various embodiments of a storage unit 152 that has a transaction engine 403, which provides data coherency for atomic transfers of logical records. It is desirable that an atomic transfer of a logical record be completed even if there is an event, such as power loss or interruption, an operating system crash, a software application crash, or another event impacting data coherency mechanisms. The transaction engine 403 has a transaction interlock 503, which acts as an interlock or lockout mechanism, i.e., an interlock for transactions, for each atomic update, which is a transfer of a complete logical record. This mechanism prevents the possibility of loss of coherency to a logical record at various locations in the storage unit 152, as might otherwise occur in the above-described events. Architecture of one embodiment of the storage unit is described with reference to FIG. 8. Details of an embodiment of the transaction engine 403 are shown in FIG. 9. An operating scenario and various actions occurring in a storage unit 152 are described with reference to FIG. 10. The embodiment of FIG. 12 illustrates an action diagram that enables a non-disruptable upgrade that may utilize the atomic transfer described in FIGS. 8-11.

FIG. 8 is a block diagram of an embodiment of a non-volatile solid-state storage unit storage unit 152 with a transaction engine 403 that provides an interlock for atomic updates. Various components of the transaction engine 403 in the storage unit 152 interact with the controller 212 (see also FIG. 3), and can be implemented in software, hardware, firmware or combinations thereof. Some of these components can be implemented in memory (e.g., buffers, queues, pointers, data structures) such as the non-persistent memory 405 and/or registers or memory resident in the controller 212, etc. The non-persistent memory 405 can be implemented with the NVRAM 204, the DRAM 216, or other RAM or memory that does not persist or retain data for long periods of time. The persistent memory 407 can be implemented with flash memory 206 or other memory that does persist or retain data for long periods of time. A DMA unit 214 and an energy reserve 218 are included in the storage unit 152 (see also FIG. 3), in some embodiments. The controller 212 sends logical records (e.g., data, which will be further described with reference to FIG. 6) to the transaction engine 403. The transaction engine 403 transfers each logical record to non-persistent memory 404, applying a transaction interlock 503 (which will be further described with reference to FIG. 5).

In case of an event, an event input 409 (e.g., a status input, an interrupt input, a port bit, etc.) to the transaction engine 403 informs the transaction engine 403 to complete any atomic update in progress. Then, the DMA unit 214 copies the contents of the non-persistent memory 405 to the persistent memory 407. These actions are supported by the energy reserve 218, which stores sufficient electrical power to allow these operations to complete. The energy reserve 218 thus provides power to a power loss hold up domain. During recovery, after the event, the storage unit 152 has a coherent image in the persistent memory 407 of the last atomic update, and can rely on this not being corrupted. Were it not for the transaction interlock 503, it might be possible to have a portion of a logical record missing and not have any indication that this is so.

FIG. 9 is a block diagram of an embodiment of the transaction engine 403 of FIG. 4, showing a transaction interlock 503. In various embodiments, the transaction interlock 503 could be part of the transaction engine 403, or could be separate from and coupled to the transaction engine 403. The transaction engine 403 and transaction interlock 503 have a transaction record buffer 507, a command queue 509, and a transaction indicator 511, and a transfer engine 513, in the embodiment shown. In further embodiments, various further components could replace or augment one or more of these components, and various further combinations are readily devised. The transaction record buffer 507 can be implemented as a linear buffer 515 or a circular buffer 517, and in one embodiment is about 64 kB (kilobytes) long. In some embodiments, the transaction record buffer 507 is implemented in a portion of the non-persistent memory 405, or in memory resident in the controller 212. Logical records 505 or payloads arriving at the transaction engine 403 (e.g., from the controller 212 of the storage unit 152) are written into the transaction record buffer 507, for example in serial order (although further embodiments could have these written in parallel into a transaction record buffer 507). As an illustration, a logical record could include hundreds or thousands of bytes of data, and the transaction record buffer 507 is preferably long enough to hold many logical records (i.e., not just one or two). At a very minimum, the transaction record buffer should be at least one hundred bytes long in some embodiments.

The command queue 509 holds a description of a transfer of a logical record 505. In one embodiment, the command queue 509 is a data structure that holds a sequence number 519 corresponding to the logical record 505, an origin 521 of the logical record 505, a destination 523 of the logical record 505, and a size 525 of the logical record 505. For example, the command queue 509 could be implemented in a portion of the non-persistent memory 405, or in memory or a register resident in the controller 212, etc. The transaction indicator 511 is a data structure that holds pointers to the transaction record buffer 507 in some embodiments. An end pointer 527 points to the end of the logical record(s) in the transaction record buffer 507, i.e., points to the end of the last logical record 504 written into the transaction record buffer 507 at any given time. A start pointer 529 points to the beginning of the next logical record 505 to be transferred out of the transaction record buffer 507. In some embodiments, a transfer engine 513 coordinates transfers of logical records 504 from the transaction record buffer 507 to the non-persistent memory 405 once one or more descriptions of transfers of logical records are written to the command queue 509 (e.g., by the controller 212 of the storage unit 152). Various implementations are possible for a transfer engine 513, which could be a state machine, hardwired or implemented in software or firmware, or could be software code executing on a processor such as the controller 212, etc. The above components cooperate as the transaction interlock 503 and the transaction engine 403. In one embodiment, the transaction interlock 503 includes the transaction record buffer 507, the command queue 509 and the transaction indicator 511. In some embodiments, the transfer engine 513 couples to the DMA unit 214, and employs the DMA unit 214 to transfer logical records 505.

Still referring to FIGS. 4 and 5, an atomic update, in the context of the transaction engine 403, is a transfer of an entire logical record 505 from the transaction record buffer 507 to the non-persistent memory 405, as performed by the transfer engine 513 (via the DMA unit 214, in some embodiments). Logical records 505 are handled along the way by the controller 212 of the storage unit 152, which receives logical records 505 from one or more storage nodes 150 of the storage cluster 160. To begin a process of storing logical record(s) 505, also referred to as inserting a payload, one or more storage nodes 150 assign a sequence number to each logical record 505 and determine a set of devices, namely storage units 152 to which to transmit the logical records 505. The payloads are transmitted, i.e., logical records 505 are sent to storage units 152, with the intent or goal of copying the logical records into a set of addresses in volatile memory, e.g., non-persistent memory 405, which can occur outside of any interlock. The controller 212 of a storage unit 152 receiving such a payload forms a logical record 505 corresponding to the data written into the non-persistent memory 405 between a starting record address and an ending record address. Among other information, the logical record 505 may contain the assigned sequence number. The controller 212 copies the logical record 505 into the transaction record buffer 507, using as many words (or bytes, etc.) and bus transfers as appropriate to complete this copy. Essentially, the transaction record buffer 507 is used as an intermediary device, which the controller 212 writes into and which interacts with the transaction interlock 503. The transaction engine 403 uses the transaction record buffer 507 as an input. Next, the controller 212 writes to the command queue 509, which is also an input to the transaction engine 403. The controller 212 writes the end pointer 527 of the transaction record buffer 506. Once the controller 212 finishes writing all of the words to a logical record 505 (e.g., hundreds, thousands, tens of thousands of words, etc.), the controller 212 makes this single, final (for that atomic transfer) write to the command queue 509, as a second time point. The above actions and information constitute the controller 212 programming and triggering the transaction engine 403. With the transaction record buffer 507 and the command queue 509 as inputs to the transaction engine 403, the transaction interlock 503 is now equipped to perform the atomic update as an interlocked transaction. The transaction engine 403 has retained the previous time point (i.e., the previous time the second time point was written) from the last atomic update, and applies this as a first time point for the current atomic update. The transaction engine 403 interprets the writing of the second time point as a trigger to copy the entire logical record 505, which is the data from the first time point to the second time point in the transaction record buffer 507, to the non-persistent memory 405 in some embodiments. Applying the first time point for the start pointer 529, and the second time point for the end pointer 527, the transaction engine 403 now copies the logical record 505, including the sequence number 519, the origin 521, the destination 523, and the size 525, from the transaction record buffer 507 to the non-persistent memory 405. When this transfer is complete, the transfer engine 513 retains the second time point as a first time point (e.g., start pointer 529) for the next atomic transfer, pointing to the next logical record 505 in the transaction buffer 507. The transfer engine 513 repeats the above actions for the next atomic transfer, immediately if the next time point is available, or later when the next time point arrives.

With this mechanism, the information in the transaction record buffer (any logical records 505 waiting for transfer), the command queue 509 (the description of the most recent transfer), the transaction indicator 511 (pointing to beginning and end of logical records 505 awaiting transfer) and the non-persistent memory 405 (which includes the complete logical record 505 most recently transferred) is consistent and coherent. This process repeats with each next atomic update and transaction. Writing the description of the transfer to the command queue 509 constitutes a transaction commit, since the atomic update (i.e., the transfer of the logical record 504 from the transaction record buffer 507 to the non-persistent memory 405) is guaranteed by the system to occur (or to have occurred). The command queue 509 has a fully formed command, which the transaction engine 403 with transaction interlock 503 can act on to transfer the logical record 505, between the first time point and the second time point, in a guaranteed, interlocked manner. The system is further guaranteeing that, even in the case of power loss or a crash, a coherent image of this atomic update (the one for which the transaction commit is made) will be available in the persistent memory 407 for use during recovery.

Figure 10:
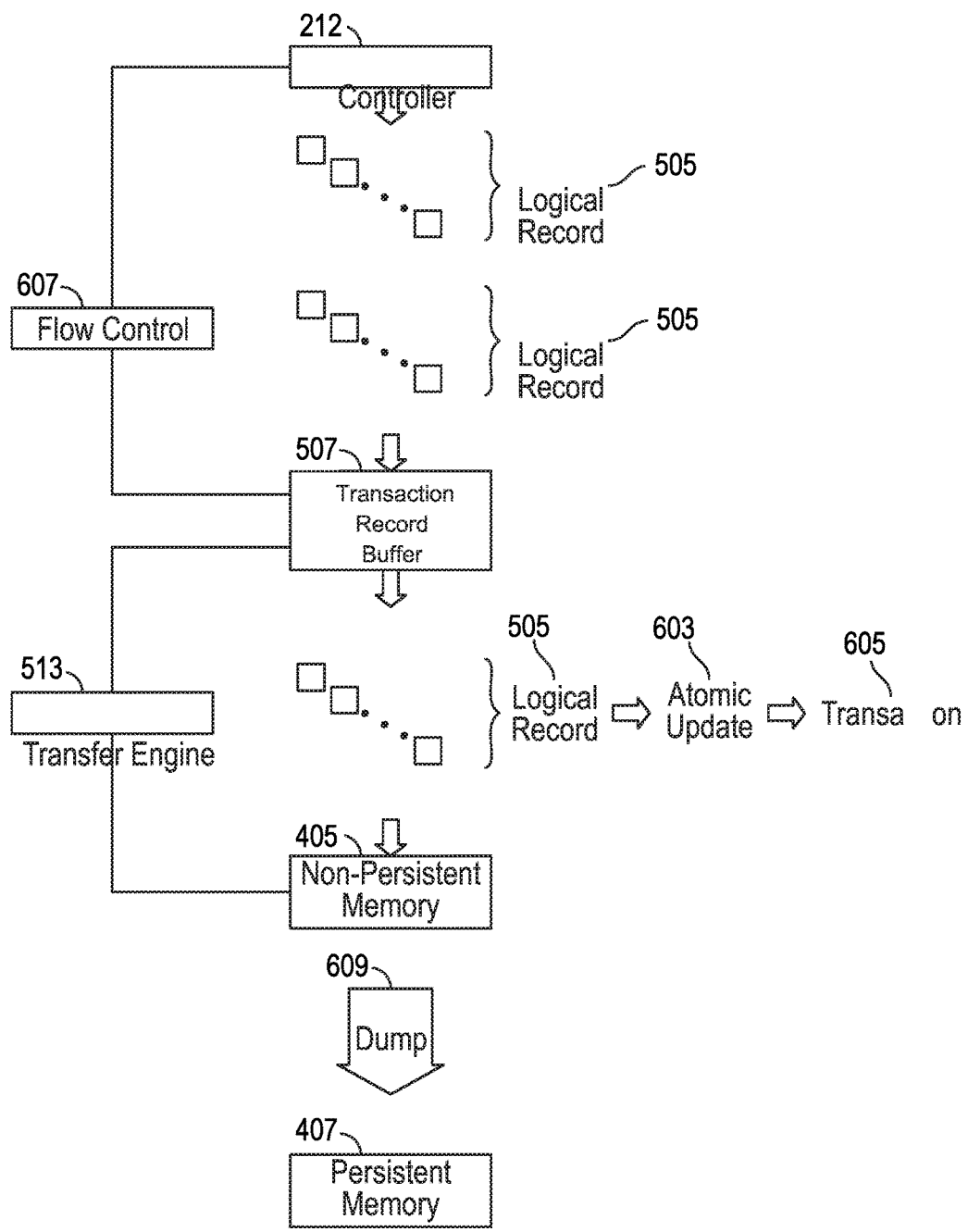
FIG. 10 is an action diagram showing flow control applied to logical records arriving at the transaction record buffer, and the transfer engine applied to an atomic update as a transaction in which a logical record is transferred from the transaction record buffer to non-persistent memory, in accordance with some embodiments.

FIG. 10 is an action diagram showing flow control 607 applied to logical records 505 arriving at the transaction record buffer 507, and the transfer engine 513 applied to an atomic update 602 as a transaction 604 in which a logical record 505 is transferred from the transaction record buffer 507 to non-persistent memory 405. With reference back to FIG. 3, a storage node 150 is passing (i.e., sending) logical records 505 to one of the storage units 152, and (continuing with FIG. 10) the controller 212 of the storage unit 152 is sending the logical records 505 to the transaction record buffer 507. This is moderated by a flow control unit 607, which updates the end pointer 527 (see FIG. 9) of the transaction indicator 511 as logical records 505 are loaded into the transaction record buffer 507. In this manner, the end pointer 527 tracks the end of the last logical record 505 that was written into the transaction record buffer 507. The flow control unit 607 operates to prevent new logical records 504 from overwriting existing logical records 504 in the transaction record buffer 507. In FIG. 10, the logical records 505 are shown broken into portions, which is symbolic of the transfer rate and bus width between the controller 212 and the transaction record buffer 507. Generally, the width of this bus is determined by the bus width of the controller 212, and the length of a logical record 505 is greater than this bus width.

The transfer engine 513 moderates transfers of logical records 505 from the transaction record buffer 507 to the non-persistent memory 405, as described above with reference to FIGS. 8 and 9. Each logical record 505 so transferred is an atomic update 603 and is according to a transaction 605 as tracked, committed and interlocked by the transfer engine 513 in cooperation with the transaction interlock 503. The logical records 505 are shown broken into portions between the transaction record buffer 507 and the non-persistent memory 405, which is symbolic of the transfer rate and bus width between the transaction record buffer 507 and the non-persistent memory 405. In some embodiments, this bus width is wider than the bus width of the controller 212, which results in improved throughput.

A dump 609 (e.g., a copy or transfer) of the contents of non-persistent memory 405 to persistent memory 407 is illustrated in FIG. 10. This dump 609 could occur (e.g., be triggered) in response to an event, such as power loss, or crash of an operating system or application. In the embodiment shown, the transfer engine 513 waits until after completion of an atomic update 603, then performs the dump 609. In this manner, the persistent memory 407 then has a coherent image of the most recent atomic update 603 (and other atomic updates 603 preceding it). There is no possibility of a partial completion of an atomic update, no possibility of a portion of the atomic update disappearing, no possibility of information stating that the atomic update has completed when in fact it has not, and no possibility that there is only partial duplication of the atomic update into the persistent memory 407. The system can rely on this capability during recovery, after power has been restored, the operating system is rebooted or the application is restarted, so that data is recoverable and is not corrupted.

Figure 11:
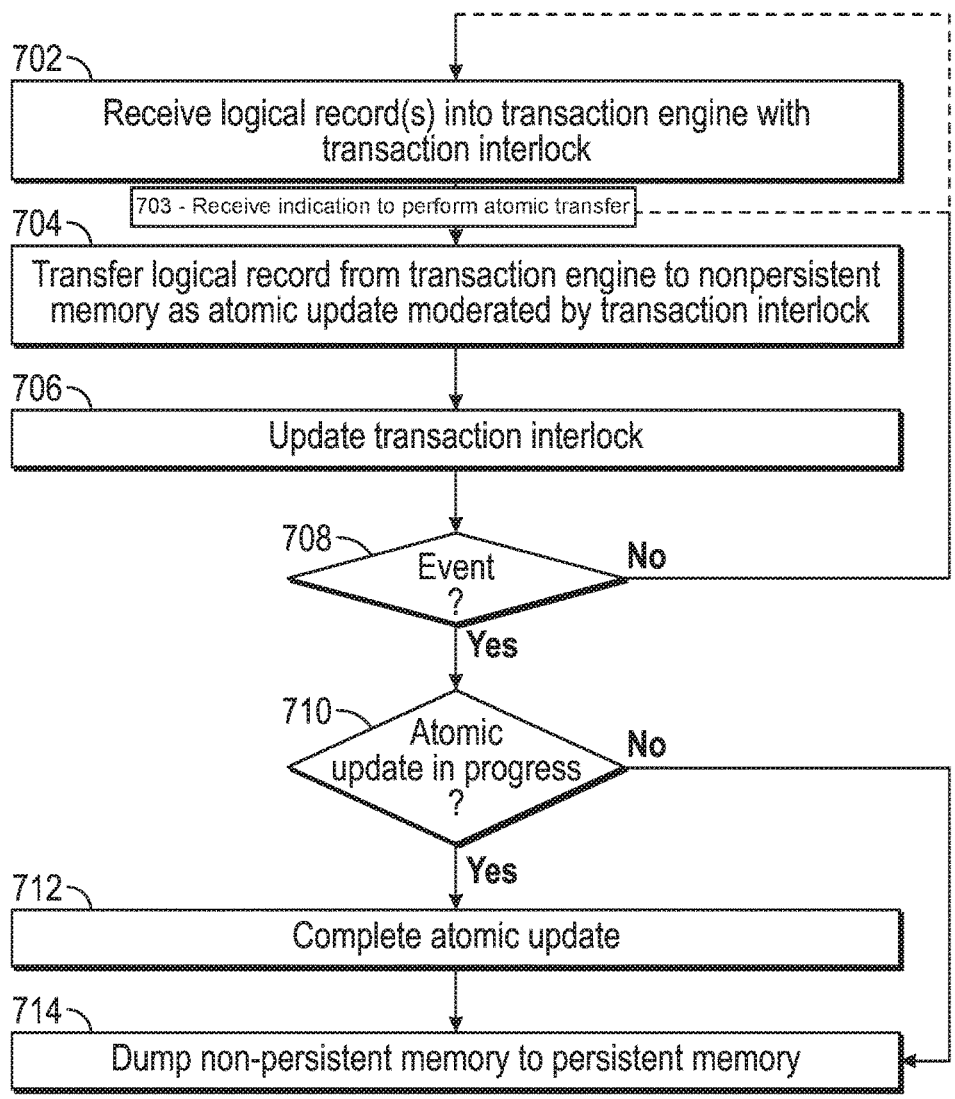
FIG. 11 is a flow diagram of a method for a transactional commit in a storage unit, which can be practiced on or using embodiments of the storage unit of FIGS. 8-10, in accordance with some embodiments.

FIG. 11 is a flow diagram of a method for a transactional commit in a storage unit, which can be practiced on or using embodiments of the storage unit of FIGS. 8-10. In various embodiments, the method can be practiced by a processor of the storage unit, and/or by components of the storage unit. In some embodiments, the method may be practiced by a processor of the storage node, and/or by components of the storage node. In an action 702, one or more logical records are received into the transaction engine, with transaction interlock. For example, logical records can be received into the transaction record buffer. In an action 703, an indication to perform an atomic transfer is received into the command queue of the transaction engine. This could be the time point which is sent by the controller of the storage unit, which is applied by the transaction engine to update the end pointer of the transaction indicator, and which acts to trigger the atomic update as an interlocked transaction. The start pointer of the transaction indicator can be set to point to the beginning of the next logical record to be transferred out of the transaction record buffer, for example by applying the previous time point. In an action 704, a logical record is transferred from the transaction engine to non-persistent memory as an atomic update moderated by the transaction interlock. It should be appreciated that this transfer is an atomic update. In an action 706, the transaction interlock is updated. Updating the command queue upon completion of the transfer is part of the interlock update, in some embodiments. Updating the start pointer of the transaction indicator, to point to the next logical record to be transferred, is part of the interlock update, in some embodiments.

In a decision action 708, it is determined whether there is an event. The event could be loss of power (although an energy reserve supports completion of various operations, in some embodiments). The event could be an operating system crash (although the storage unit has a dedicated processor and software that is not affected by an operating system crash, in some embodiments). The event could be an application crash (although the storage unit has a dedicated processor and software that is not affected by an application crash, in some embodiments). The event may be any suitable event impacting data coherency mechanisms. If there is no event, flow branches back to the action 704, to transfer another logical record, or back to the action 702 to receive more logical records. If there is an event, flow advances to the decision action 710.

In the decision action 710, it is determined whether there is an atomic update in progress. If there is an atomic update flow branches to the action 712, to complete the atomic update. Flow then proceeds to the action 714. If there is not an atomic update, flow branches to the action 714. In the action 714, the non-persistent memory is dumped to the persistent memory. In other words, contents of the non-persistent memory are copied or transferred to the persistent memory. Because of the transaction interlock, and the completion of any atomic update that is in progress when the event occurs, the dump results in the persistent memory having a coherent image (i.e., uncorrupted) of the most recent atomic update, and other updates preceding it.

Figure 12A:
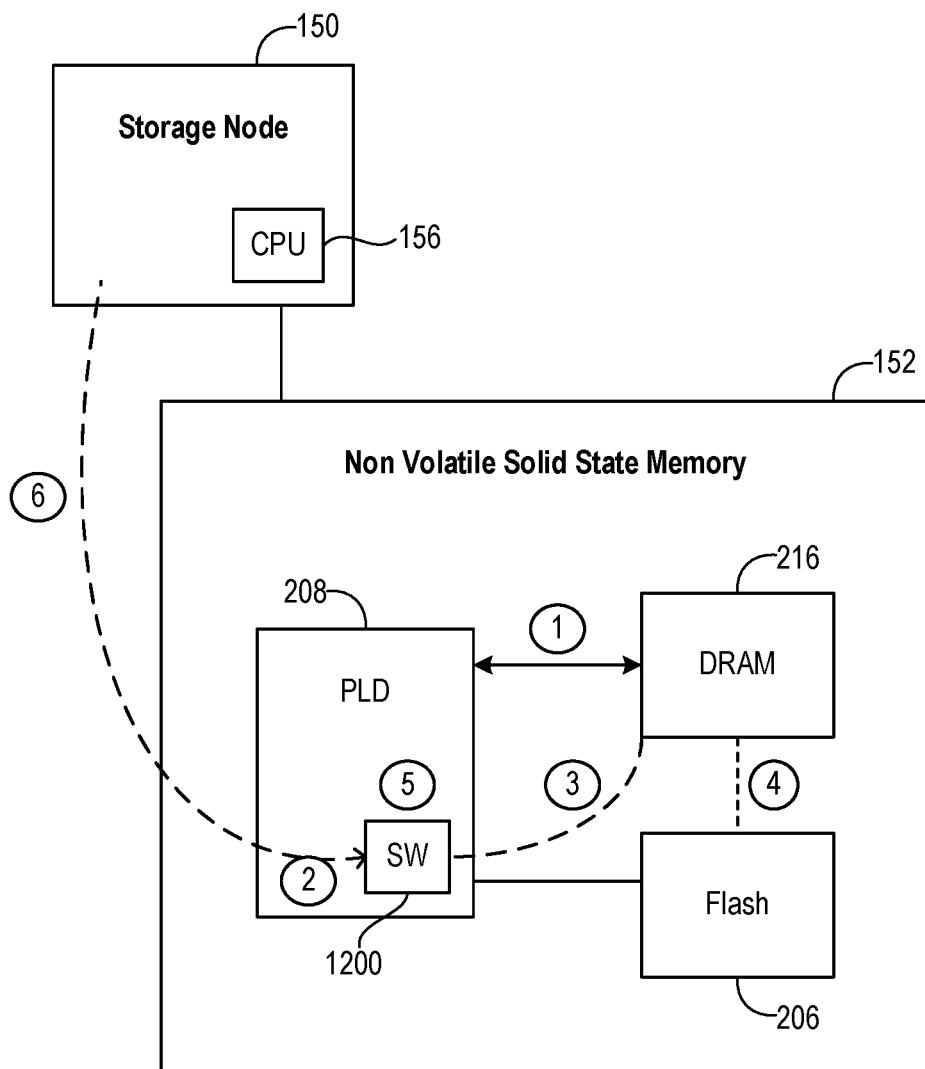
FIG. 12A illustrates a storage system in an action diagram that enables a non-disruptable upgrade that may utilize the atomic transfer described in FIGS. 8-11, in accordance with some embodiments.

FIG. 12A illustrates a storage system in an action diagram that enables a non-disruptable upgrade that may utilize the atomic transfer described in FIGS. 8-11, in accordance with some embodiments. Software upgrades sometimes change the format in which flash data is laid out in a storage system. The embodiments provide for a non-disruptive checkpointing mechanism that stores the old or prior format persistently before starting or initiating the upgrade. The embodiments describe the hardware support provided to atomically persist the old or prior format prior to performing or initiating the upgrade non-disruptively. Storage node 150 includes CPU 156 and is in communication with non-volatile solid state memory 152. Non-volatile solid state memory 152 includes PLD 208, which can execute software 1200. PLD 208 is in communication with DRAM 216 and flash 206. FIG. 12 is one example of the architecture for non-volatile solid state memory and not meant to be limiting as other variations, such as where software 1200, DRAM 216, and flash 216 reside may be varied, e.g., outside of or external to, the non-volatile solid state memory, in other embodiments. In action 1, it is verified that the DRAM 216 and the Flash 206 are set up for the upgrade. In action 2, all services are stopped and software 1200 is stopped to signal that the upgrade may initiate. In action 3, the FPGA is triggered to persist the old/prior state and in action 4 PLD 208 orchestrates the DRAM 216 to Flash 206, which may be NAND flash, transfer. It should be appreciated that at this time software has stopped, i.e., it is not receiving any commends and PLD 208 is ensuring that all DRAM 216 contents are correctly written out to Flash 206. In some embodiments, it is ensured that the process completes even under a power loss as described above. As noted above energy reserve 218 can ensure completion of the process once initiated even if a power loss occurs. In action 5, PLD 208 informs software 1200 that the transfer is complete and the data is persisted. In action 6, software 1200 is instructed to initiate the upgrade to the new format as the old/prior state has been persisted.

Figure 12B:
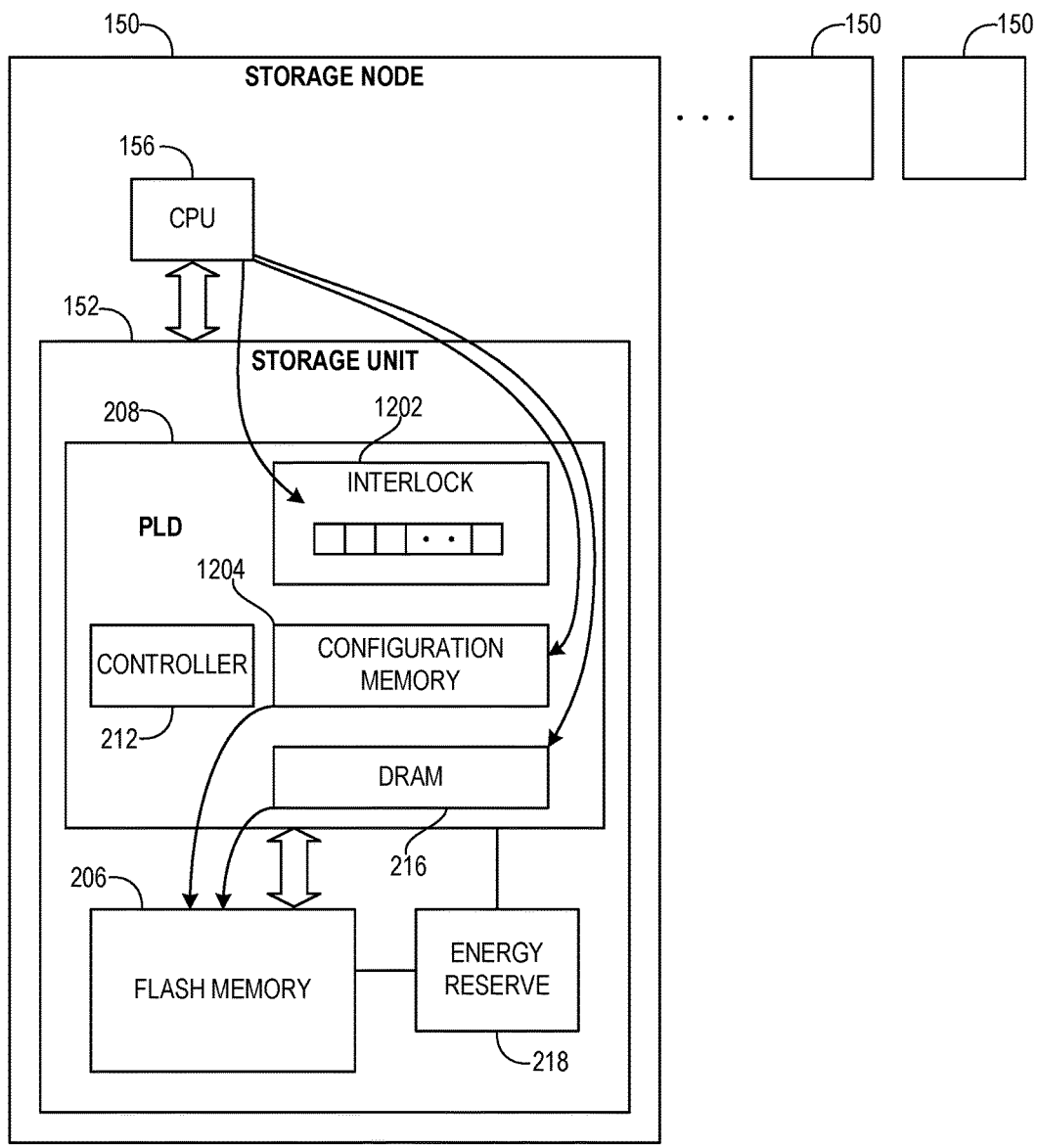
FIG. 12B illustrates a further embodiment of the storage system of FIG. 12A in an action diagram showing actions of an interlock involved in a non-disruptive upgrade of the storage system.

FIG. 12B illustrates a further embodiment of the storage system of FIG. 12A in an action diagram showing actions of an interlock 1202 involved in a non-disruptive upgrade of the storage system. In this embodiment, the interlock 1202 is implemented as a register or memory location in the storage unit 152, for example in the PLD 208 (which could be an FPGA), and is accessible by both the CPU 156 of a storage node 150, and the controller 212 in the PLD 208 in the storage unit 152. A configuration memory 1204 of the PLD 208 has the configuration information for the PLD 208. The DRAM 216 is used by the CPU 156 of various storage nodes 150, and the controller 212 in the storage unit 152, for holding user data and metadata. In one embodiment, the metadata in the DRAM 216 includes configuration information that describes how data is formatted in the storage system. An energy reserve 218, such as battery backup or a super capacitor, supplies power to the PLD 208, including the controller 212, the configuration memory 1204 and the DRAM 216, and the flash memory 206 in case of power loss.

In an upgrade, the configuration information in the DRAM 216 may need upgrading and/or the configuration of the PLD 208, held in the configuration memory 1204, may need upgrading. It is desirable to perform the upgrade without power cycling, which would be disruptive and time-consuming for the system, since power loss involves data flushing, a reboot, and data recovery in addition to writing the new configuration information into the configuration memory 1204 and/or the DRAM 216. Other systems are known in which system upgrades require power cycling (i.e., shutting off the power, restoring power) so that the new configuration information is loaded in on or after reboot, and the present embodiments are an improvement on such disruptive system upgrades.

To engage the interlock 1202, the CPU 156 of one of the storage nodes 150 writes to the interlock 1202 in the storage unit 152, for example writing one or more bits with specified values. This is seen as a request to engage the interlock to disable access and begin on upgrade process. The interlock 1202 disables access by the CPUs 156 of the storage nodes 150 to the configuration memory 1204 and the DRAM 216. One mechanism by which the interlock 1202 could do so is that the CPU 156 can read the interlock 1202 and determine the value in the interlock 1202. If the value in the interlock 1202 indicates access is disabled, the CPU 156 of the storage node 150 honors this (e.g., as directed by software executing on that CPU 156) and does not attempt to access the configuration memory 1204 or the DRAM 216. Relatedly, when the value in the interlock indicates access is enabled, the CPU 156 of the storage node 150 acts accordingly and accesses or is permitted to access the configuration memory 1204 or the DRAM 216 (e.g., as directed by software executing on that CPU 156). Another mechanism by which the interlock 1202 could do so is to have hardware circuitry acting on one or more bit lines from the interlock 1202 and gating reads or writes and/or address decoding or the like, so that hardware logic prevents or enables access to the configuration memory 1204 and the DRAM 216 according to the value in the interlock 1202. Further mechanisms, including combination software and hardware mechanisms, are readily devised in accordance with the teachings herein.

With the interlock 1202 disabling access by the processor(s) 156 of the storage node(s) 150, the controller 212 then persists the configuration information in the configuration memory 1204 and the configuration information in the DRAM 216 to the flash memory 206. Similar mechanisms are used by the interlock 1202 and the controller 212, such as the controller 212 reading the value from the interlock 1202 and honoring this value as a direction to persist configuration information when the interlock 1202 is disabling access by the CPU(s) 156 (e.g., as directed by software executing on the controller 212). Or, hardware circuitry acting on one or more bit lines from the interlock 1202 could gate or steer reads and writes by the controller 212, or enable DMA 214 (see FIG. 3). The controller 212 could perform the persisting by reads and writes, or activating DMA 214.

Once the controller 212 finishes persisting contents of the configuration memory 1204 and/or the DRAM 216, the controller 212 writes to the interlock 1202 to reenable access by the CPU 156 of a storage node 150 to the configuration memory 1204 and the DRAM 216. Alternatively, the controller 212 could send a message to a CPU 156, and the CPU 156 could write to the interlock 1202 to reenable access. And, when the CPU 156 determines the interlock 1202 has reenable access by the CPU 156 to the configuration memory 1204 and the DRAM 216, the CPU 156 writes the upgrade configuration information to the configuration memory 1204 for the PLD 208 and/or writes upgrade information to the DRAM 216. With new configuration information in the configuration memory 1204, the PLD 208 loads the configuration information and reconfigures accordingly. With new configuration information in the DRAM 216, for example specifying a new format of data layout in the DRAM 216 or the flash memory 206, the controller 212 and/or the CPU 156 handle and layout data accordingly.

Above actions, with the interlock disabling CPU 156 access to the configuration memory 1204 and/or the DRAM 216, the controller 212 persisting the configuration memory 1204 and/or the DRAM 216 to the flash memory 206, the interlock re-enabling CPU 156 access to the configuration memory 1204 and the DRAM 216, and the CPU 156 writing upgrade configuration information to the configuration memory 1204 and/or the DRAM 216 are non-disruptive and performed under continuous supplied power. If power is lost at any time during this process, the energy reserve 218 has sufficient capacity (e.g., battery or super capacitor size and charging level) to provide power so that the persisting can be completed. Upon recovery of power, the system can recover the persisted configuration information and resume the upgrade process, with no loss of state of the system. The non-disruptive upgrade is thus performed as an atomic operation, through the interlock 1202, without need of power cycling, and without loss of state information should power be lost.

Figure 13A:
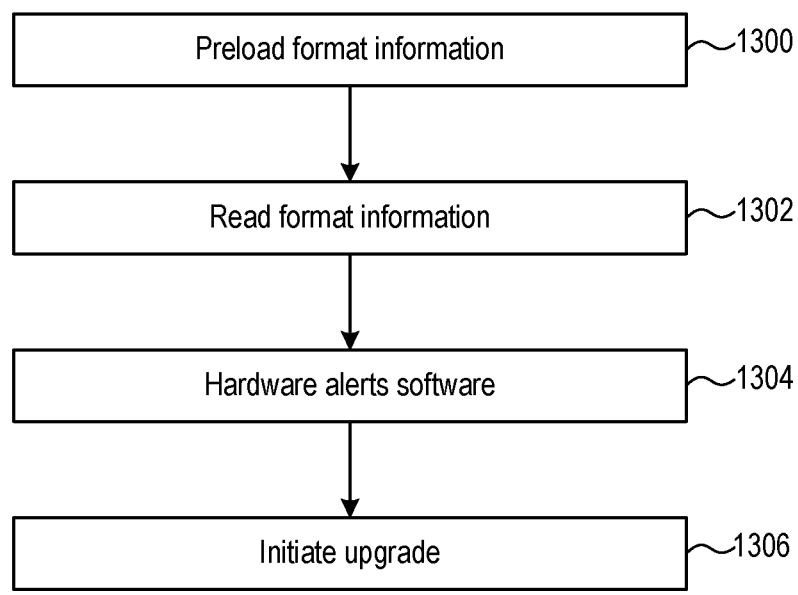
FIG. 13A is a flowchart diagram illustrating method operations for providing a non-disruptable upgrade in accordance with some embodiments.

FIG. 13A is a flowchart diagram illustrating method operations for providing a non-disruptable upgrade in accordance with some embodiments. The method initiates with operation 1300 where software preloads the format information that needs to be saved. In some embodiments Software sets a bit asking hardware to persist the format information. In operation 1302 hardware takes care of reading out the format information saved in a volatile memory (DRAM on the storage unit), and persists it to flash (NAND). It should be appreciated that this process involves programmable logic on the PLD reading out DRAM and writing the data read out to pre-erased blocks on the flash in some embodiments. Upon successful completion, hardware alerts software in operation 1304. Software then goes ahead and performs the upgrade in operation 1306. As noted above, there is a backup battery, super capacitor or other power reserve which ensures that hardware is always powered on long enough to complete saving the state of the machine prior to the upgrade. It should be appreciated that this entire process is atomic, meaning that no other transactions are allowed until the hardware is done with the entire restore process. In this manner, hardware is able to store the old state of the machine atomically under continuous supplied power, without requiring a power-cycle. Alternative approaches requiring power-cycling of the hardware result in a disruptive upgrade cycle due to the long delays involved in cycling the machine. Approaches that involve software writing out the old format cannot easily provide atomicity guarantees.

Embodiments as described above provide for a non-disruptive upgrade. This compares to former methods of upgrading, including one method known colloquially as a "forklift upgrade", in which the data must be migrated off of components that are being replaced. Components are then removed and replaced with upgraded components, and the data is migrated back into the new components. In addition, power cycling is need in many upgrades where the format of the data laid out on the drives is being changed. In the presently described storage cluster 160, components can be replaced or added, or the layout of the data may be changed for a software upgrade, and the system remains online and accessible during the upgrade process. The storage cluster 160 reconfigures to absorb the new components and/or accommodate the change in format of the data. A full upgrade of the system may occur incrementally through the embodiments described herein. For example, as newer solid-state technology is developed, where the technology has different size limitations than previous generations, the embodiments enable the introduction of the newer solid-state technology to replace a defective storage node, add additional capacity, take advantage of newer technology, etc. In time, the entire system may be replaced and/or upgraded through the incremental storage node replacements. In addition to adding capacity, the embodiments also cover the deletion of capacity in a non-disruptive manner Thus, the embodiments provide for a non-disruptive upgrade for software or hardware upgrades.

Figure 13B:
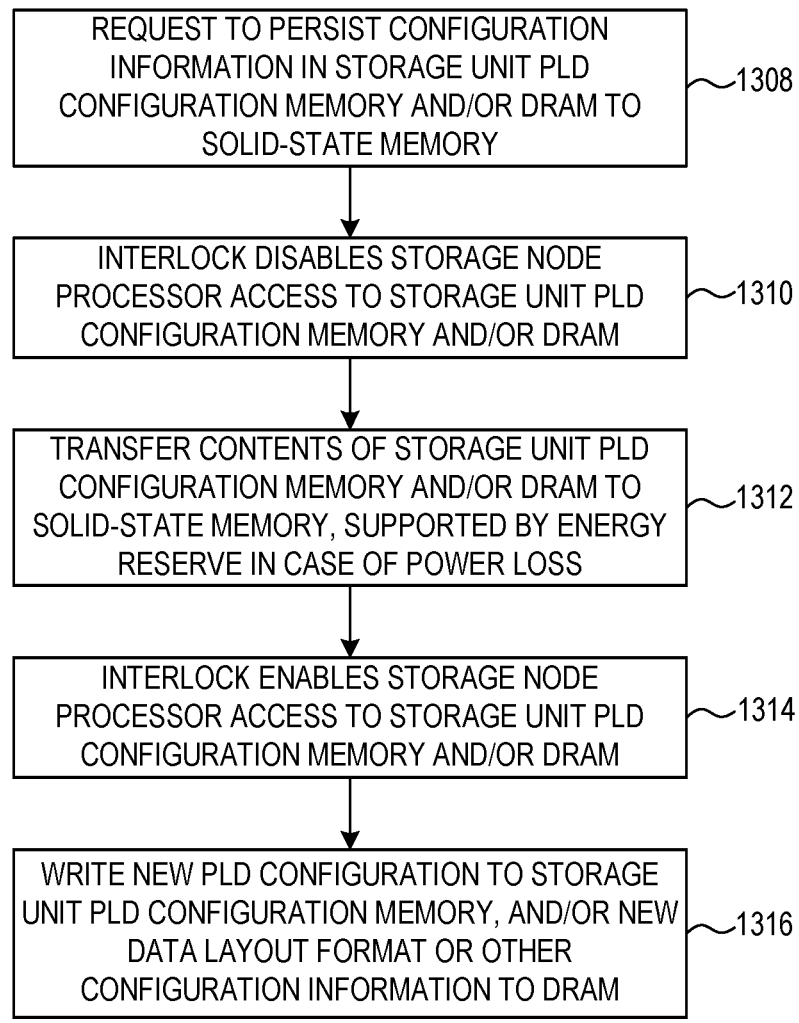
FIG. 13B is a flowchart diagram illustrating further method operations for providing a non-disruptive upgrade in a storage system in accordance with some embodiments.

FIG. 13B is a flowchart diagram illustrating further method operations for providing a non-disruptive upgrade in a storage system in accordance with some embodiments. The method can be performed by various embodiments of a storage system as described herein, and more specifically by one or more processors in a storage system. Storage nodes, and authorities in storage nodes, and storage units can practice this method. In an action 1308, a request is made to persist configuration information in a storage unit PLD configuration memory and/or DRAM to solid-state memory. Such a request could be made, for example, by writing to the interlock as described above with reference to FIG. 12B. In an action 1310, the interlock disables storage node processor access to storage unit PLD configuration memory and/or DRAM. A software only, a hardware only, or a combination software and hardware mechanism as described above could be used to accomplish this. In an action 1312, contents of the storage unit PLD configuration memory and/or DRAM are transferred (e.g., by reading and writing, or DMA) to solid-state memory, supported by an energy reserve in case of power loss. This persists the configuration information from the PLD configuration memory and/or DRAM to the solid-state memory. The interlock enables storage node processor access to storage unit PLD configuration memory and/or DRAM, in an action 1314. Such re-enabling by the interlock takes place after the persisting, and could be initiated by the storage unit, or more specifically the controller in the storage unit, writing to the interlock 1202. With access re-enabled, the new PLD configuration is written to the storage unit PLD configuration memory and/or the new data layout format or other configuration information is written to DRAM, in an action 1316, for example by a CPU of a storage node.

Figure 14:
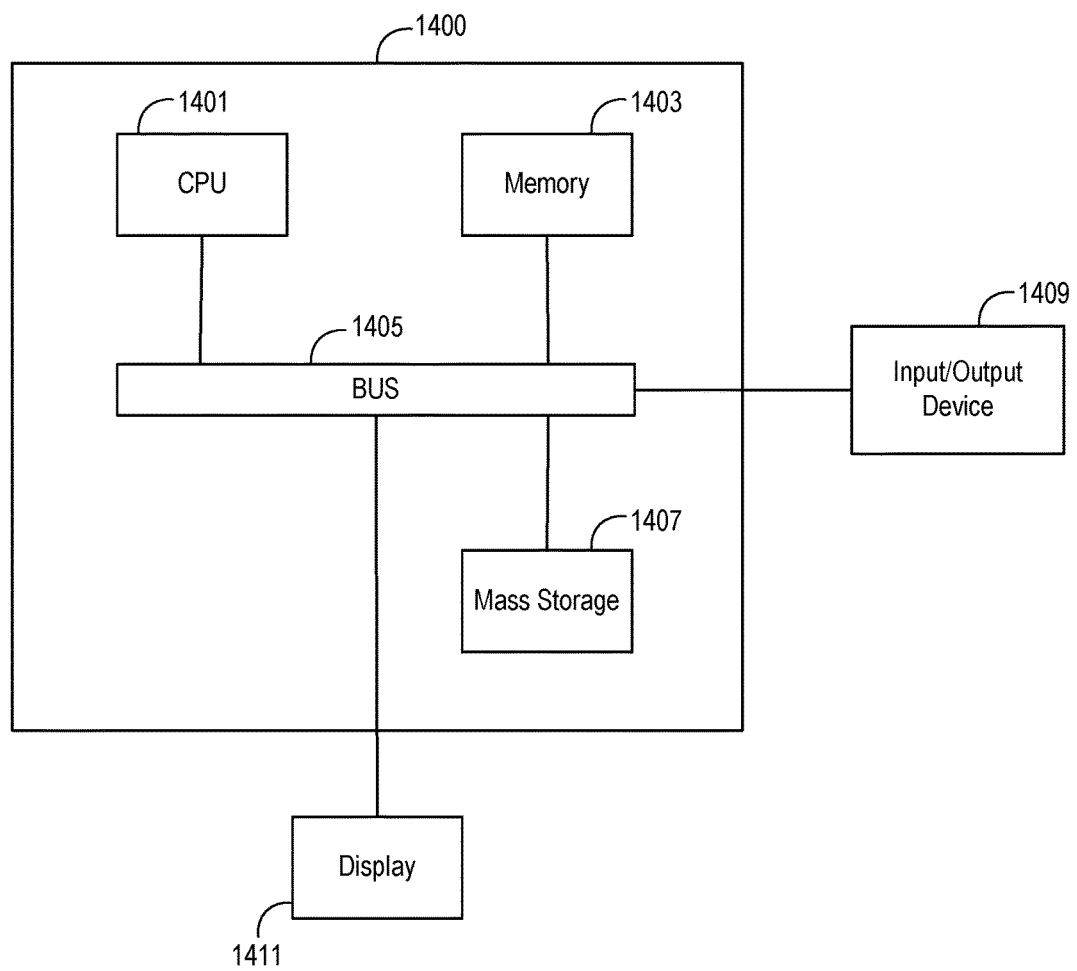
FIG. 14 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 14 is an illustration showing an exemplary computing device which may implement the embodiments described herein. The computing device 1400 of FIG. 14 may be used to perform embodiments of the functionality for the non-disruptable upgrade discussed with reference to FIGS. 1-13 in accordance with some embodiments. The computing device 1400 includes a central processing unit (CPU) 1401, which is coupled through a bus 1405 to a memory 1403, and mass storage device 1407. Mass storage device 1407 represents a persistent data storage device such as a disc drive, which may be local or remote in some embodiments. The mass storage device 1407 could implement a backup storage, in some embodiments. Memory 1403 may include read only memory, random access memory, etc. Applications resident on the computing device may be stored on or accessed via a computer readable medium such as memory 1403 or mass storage device 1407 in some embodiments. Applications may also be in the form of modulated electronic signals modulated accessed via a network modem or other network interface of the computing device. It should be appreciated that CPU 1401 may be embodied in a general-purpose processor, a special purpose processor, or a specially programmed logic device in some embodiments.

Display 1411 is in communication with CPU 1401, memory 1403, and mass storage device 1407, through bus 1405. Display 1411 is configured to display any visualization tools or reports associated with the system described herein. Input/output device 1409 is coupled to bus 1405 in order to communicate information in command selections to CPU 1401. It should be appreciated that data to and from external devices may be communicated through the input/output device 1409. CPU 1401 can be defined to execute the functionality described herein to enable the functionality described with reference to FIGS. 1-13. The code embodying this functionality may be stored within memory 1403 or mass storage device 1407 for execution by a processor such as CPU 1401 in some embodiments. The operating system on the computing device may be MS-WINDOWS™, UNIX™ LINUX™, iOS™, CentOS™, Android™, Redhat Linux™, z/OS™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    disabling, by an interlock in one of a plurality of storage units of the storage system, access by one or more processors of a plurality of storage nodes of the storage system to a first memory in the storage unit, responsive to a request, wherein each of the plurality of storage units has solid-state memory and the plurality of storage nodes is coupled to the plurality of storage units to perform I/O (input/output) operations of the storage system across the plurality of storage units, with each of the plurality of storage nodes to generate error correction coded data stripes and write the data stripes across the plurality of storage nodes;
    persisting configuration information in the first memory to the solid-state memory in the storage unit, responsive to the disabling, with the access to the first memory by the one or more processors disabled by the interlock, wherein the persisting, the first memory and the solid-state memory are supported by an energy reserve;
    enabling, by the interlock, access by the one or more processors to the first memory, responsive to completing the persisting; and
    writing, by the one or more processors of the storage system, to the first memory, to perform the upgrade with further configuration information, with the access enabled by the interlock and wherein at least the persisting is accomplished under continuous supplied power.

2. The method of claim 1, wherein the request includes writing to one or more bits of one or more registers in hardware or firmware external to the one or more processors, as a part of the interlock.

3. The method of claim 1, wherein the persisted configuration information represents a first state and the further configuration information represents an upgraded state.

4. The method of claim 1, wherein the configuration information and the further configuration information comprise a format for storing data in the first memory.

5. The method of claim 1, wherein the persisting is performed by hardware, firmware, or a further one or more processors, that is coupled to the first memory and the solid-state memory and supported by the energy reserve.

6. The method of claim 1, wherein the storage system comprises a plurality of storage nodes organized as a storage cluster, with the one or more processors of the storage system being in the storage nodes and the persisting occurring in a storage unit having the first memory, the solid-state memory and the energy reserve.

7. The method of claim 1, wherein:
    the persisting comprises writing contents of a RAM (random access memory) as the first memory to the solid-state memory; and
    the persisting completes during a power interruption.

8. A storage system, comprising:
    a first memory in each of a plurality of storage units of the storage system, configurable to contain configuration information;
    a solid-state memory in each of the plurality of storage units of the storage system, configurable for storage of user data;
    one or more processors in each of a plurality of storage nodes of the storage system, coupled to the plurality of storage units of the storage system and configurable to perform I/O (input/output) operations for the storage system, with each of the plurality of storage nodes to generate error correction coded data stripes and write the data stripes across the plurality of storage nodes, and each of the plurality of storage nodes configurable to perform an upgrade to the storage system by writing further configuration information to the first memory;
    hardware, firmware or one or more further processors in each of the plurality of storage units of the storage system, coupled to the first memory and the solid-state memory, configurable to have an interlock in the storage unit that disables and enables access by the one or more processors of the plurality of storage nodes to the first memory in the storage unit;

the hardware, firmware or one or more further processors in each of the plurality of storage units further configurable to persist the configuration information in the first memory to the solid-state memory in the storage unit, responsive to a request for performing the upgrade and responsive to the interlock disabling the access by the one or more processors to the first memory, wherein at least persisting the configuration information is non-disruptive and performed under continuous supplied power; and an energy reserve configurable to support the hardware, firmware or one or more further processors, the first memory and the solid-state memory during power loss.

9. The storage system of claim 8, further comprising:
the hardware, firmware or one or more further processors having one or more bits to which the one or more processors have write access to request that the hardware, firmware or one or more further processors persist the configuration information, as a portion of the interlock.

10. The storage system of claim 8, wherein:
the first memory is a configuration memory of an FPGA (field programmable gate array) or PLD (programmable logic device); and
the configuration information and the further configuration information specify a configuration of the FPGA or PLD.

11. The storage system of claim 8, wherein:
the first memory is a RAM (random access memory) and
the configuration information and the further configuration information specify a format of data layout in the RAM or in the solid-state memory.

12. The storage system of claim 8, wherein:
the hardware, firmware or one or more further processors comprises an FPGA (field programmable gate array) or PLD (programmable logic device).

13. The storage system of claim 8, further comprising:
a plurality of storage nodes as a storage cluster, each of the plurality of storage nodes having one or more storage units, the plurality of storage nodes having the one or more processors, the plurality of storage units having the one or more further processors, the first memory and the solid-state memory; and
the energy reserve including a battery or a super capacitor.

14. The storage system of claim 8, further comprising:
the one or more processors configured to cooperate with the interlock to perform the upgrade as a non-disruptive upgrade without power cycling, by the writing the new configuration information to the first memory with the interlock enabling access by the one or more processors to the first memory after the hardware, firmware or one or more further processors complete the persist.

15. A tangible, non-transitory, computer-readable media having instructions thereupon which, when executed by a processor in a storage system, cause the processor to perform a method comprising:
requesting the storage system to persist configuration information in a first memory in one of a plurality of storage units of the storage system to solid-state memory in the storage unit, with each of a plurality of storage nodes of the storage system coupled to the plurality of storage units of the storage system and with each of the plurality of storage nodes configurable to generate error correction coded data stripes and write the data stripes across the plurality of storage nodes, with the storage system:

utilizing an interlock in the storage unit in response to the requesting, so that the interlock disables access by the processor, in one of the plurality of storage nodes of the storage system, to the first memory in the storage unit;

persisting the configuration information from the first memory to the solid-state memory in the storage unit, by the storage unit, responsive to the requesting and the interlock disabling the read and write access by the processor to the first memory, with an energy reserve supporting the first memory and the solid-state memory; and utilizing the interlock to enable access by the processor to the first memory; and writing further configuration information to the first memory, responsive to the interlock re-enabling access by the processor to the first memory, with at least the persisting the configuration information is performed under continuous supplied power as a non-disruptive upgrade of the storage system.

16. The computer-readable media of claim 15, wherein the requesting comprises writing to at least one bit in a register in the storage system, the register external to the processor, as part of the interlock.

17. The computer-readable media of claim 15, wherein the configuration information and the further configuration information include an FPGA (field programmable gate array) image that directs a configuration of an FPGA in the storage system.

18. The computer-readable media of claim 15, wherein the configuration information and the further configuration information describe how data is formatted in the storage system.

19. The computer-readable media of claim 15, wherein the persisted configuration information represents a first state and the further configuration information represents an upgraded state.

20. The computer-readable media of claim 15, wherein:
the processor is included in one of a plurality of storage nodes of the storage system;
the interlock, the first memory, the solid-state memory and the energy reserve are included in one of a plurality of storage units of the storage system, each of the plurality of storage nodes having at least one of the plurality of storage units; and
the further configuration information comprises an upgrade to the one of the plurality of storage units.

* * * * *